United States Patent
Ueoka et al.

(10) Patent No.: US 7,519,768 B2
(45) Date of Patent: Apr. 14, 2009

(54) COMPUTER SYSTEM, MANAGEMENT COMPUTER, AND VOLUME ALLOCATION CHANGE METHOD OF MANAGEMENT COMPUTER

(75) Inventors: Atsushi Ueoka, Yokohama (JP); Takeshi Ishizaki, Yokohama (JP); Yasunori Kaneda, Sagamihara (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 11/320,964

(22) Filed: Dec. 30, 2005

(65) Prior Publication Data
US 2007/0169186 A1    Jul. 19, 2007

(30) Foreign Application Priority Data
Oct. 6, 2005    (JP)    ............................ 2005-293901

(51) Int. Cl.
    *G06F 12/00*    (2006.01)
(52) U.S. Cl. ....................................... 711/112; 711/111
(58) Field of Classification Search ....................... None
    See application file for complete search history.

(56) References Cited

U.S. PATENT DOCUMENTS
2003/0204597 A1 * 10/2003 Arakawa et al. ............. 709/226

FOREIGN PATENT DOCUMENTS
JP    2004-178253    6/2004

* cited by examiner

*Primary Examiner*—Reginald G. Bragdon
*Assistant Examiner*—Thanh D Vo
(74) *Attorney, Agent, or Firm*—Antonelli, Terry, Stout & Kraus, LLP.

(57) ABSTRACT

A computer system to prevent intervention and falsification by setting encrypted transfer between a host computer and a first storage device that provides a virtual volume and between the first storage device and second and third storage devices that provide a real volume corresponding to the virtual volume. A management computer specifies the second and third storage device that provide the real volume corresponding to the virtual volume by providing a volume corresponding to the virtual volume used by a host computer in which encrypted transfer becomes necessary, and setting the encrypted transfer to communication between the first storage device and the second and third storage devices, makes a reconnection thereof, and also sets the encrypted transfer to an I/O port used for the communication with the host computer in the first storage device.

6 Claims, 16 Drawing Sheets

| | 101 | 102 | 103 | 104 | 105 | 106 |
|---|---|---|---|---|---|---|
| Path ID | Storage Port ID | Connection Destination | Connection Destination Port ID | Security Setting | Cryptographic Key |
| P1 | Port1 | H1 | Port1 | Yes(IPSec) | xxxxxx |
| P2 | Port1 | H2 | Port1 | No | |
| P3 | Port2 | ST-1 | Port1 | Yes(IPSec) | yyyyyy |
| P4 | Port2 | ST-2 | Port1 | No | |

| Volume ID | Path ID | LUN | Virtual Flag |
|---|---|---|---|
| VOL-V01 | P1 | 1 | 1 |
| VOL-V02 | P1 | 2 | 1 |
| VOL-R01 | P2 | 1 | 0 |
| VOL-V03 | P2 | 2 | 1 |

| Virtual Volume ID | Path ID | Volume ID |
|---|---|---|
| VOL-V01 | P3 | VOL-1 |
| VOL-V02 | P3 | VOL-2 |
| VOL-V03 | P4 | VOL-1 |
| VOL-V04 | P4 | VOL-2 |

| Storage Name | Class | IP Address |
|---|---|---|
| ST-0 | Higher-Level | 100.100.100.100 |
| ST-1 | Lower-Level | 100.100.100.101 |
| ST-2 | Lower-Level | 100.100.100.102 |

| Storage Name | Port ID | Security Method |
|---|---|---|
| ST-1 | Port1 | IPSec |
| ST-1 | Port2 | IPSec |
| ST-2 | Port1 | No |
| ST-2 | Port2 | IPSec |

521, 522, 523

(a) Lower-Level Storage Disconnection Command (b) Encryption Method Setting Command (c) Lower-Level Storage Connection Command (d) Path Registration Change Command (e) Volume Allocation Command (f) Virtual Volume Allocation Command (g) Volume Migration Command (h) Mapping Change Command

COMPUTER SYSTEM, MANAGEMENT COMPUTER, AND VOLUME ALLOCATION CHANGE METHOD OF MANAGEMENT COMPUTER

CROSS REFERENCES TO RELATED APPLICATIONS

The present invention contains subject matter related to Japanese Patent Application JP 2005-293901 filed in the Japanese Patent Office on Oct. 6, 2005, the entire contents of which being incorporated herein by reference.

BACKGROUND

The present invention relates to a computer system, management computer, and volume allocation change method of the management computer to change a volume allocation in a storage network.

A storage device represented by a disk array device divides logically a storage area of a disk device in the storage device and provides to a host computer as a logical volume. A storage device which provides only one's own volume is called a lower-level storage device, another storage device which allocates a volume provided by a lower-level storage device as a virtual volume that is a virtualized volume is called a higher-level storage device, and there is a method of providing this virtual volume to the host computer.

In this case, the host computer accesses the virtual volume that is provided by the higher-level storage device. The higher-level storage device relays access data to the lower-level storage device which provides the volume corresponding to the virtual volume.

In a higher-level storage device that provides a virtual volume, a method of automating a correspondence (hereinafter, called mapping) between the virtual volume and a volume provided by a lower-level storage device that provides a real volume corresponding to the virtual volume in accordance with a required specification to the virtual volume is disclosed in the patent reference 1, for example.

[Patent Reference 1] Japanese Patent Application Publication No. 2004-178253

Incidentally, in a computer system comprised of a host computer, network device, and storage device, it is possible to prevent third party's interception and falsification of communication by encrypting the communication between a storage device that provides a volume and a host computer that uses the volume based on an encrypted transfer protocol such as IPSec (Internet Protocol Security) disclosed in the RFC-2401 standard, for example.

When such encrypted transfer is applied to communication between the host computer that uses the above-described virtual volume and a higher-level storage device that provides the virtual volume, the interception and falsification are possible on a network connecting the higher-level storage device that provides the virtual volume and a lower-level storage device that provides a real volume corresponding to the virtual volume unless the encrypted transfer is performed between the higher-level storage device that provides the virtual volume and the lower-level storage device that provides the real volume corresponding to the virtual volume, and the encrypted transfer between the host computer and the storage device that provides the virtual volume becomes useless.

Therefore, it is necessary for an administrator to set the encrypted transfer to the communication between the lower-level storage device that provides the real volume corresponding to the virtual volume and the higher-level storage device that provides the virtual volume. In addition, when the lower-level storage device that provides the real volume corresponding to the virtual volume does not support the encrypted transfer, it is necessary for the administrator to specify a storage device that supports the encrypted transfer and that provides a real volume corresponding to a virtual volume, to migrate data of the volume into that lower-level storage device that provides the real volume corresponding to the virtual volume, and to change setting of a volume of the migration destination into a virtual volume of the lower-level storage device that provides the virtual volume. Accordingly, a setting man-hour of the administrator increases, and furthermore there is a possibility of causing a setting mistake since the setting becomes complicated.

BRIEF SUMMARY OF THE INVENTION

The present invention aims at providing with a computer system, management computer, and volume allocation change method of the management computer in which encrypted transfer can be easily set between a storage device that provides a real volume corresponding to a virtual volume and a storage device that provides the virtual volume in order to provide the virtual volume used by a host computer.

In order to solve at least one of the above-described problems, one mode of the present invention is a computer system comprising of a host computer, one or two or more storage systems to store data used by the above-described host computer on a plurality of volumes, and a management computer to control the above-described storage system, wherein the above-described management computer has a memory, a processor to perform control, an interface to input and output data to the above-described storage system, and a volume allocation change program to change an allocation of a volume in the above-described storage system to a logical unit number of a volume that is recognized by the above-described host computer and an allocation of a virtual volume in which the above-described volume is allocated virtually to the above-described host computer; an identification information management table to manage identification information of the above-described storage system; a port management table to manage a port of the above-described storage system, which are provided in the above-described memory, and when security is set to a path between the above-described host computer and a volume that is provided to the above-described host computer, the above-described processor to execute the above-described volume allocation change program performs the control such that timing of notifying the above-described host computer of an access start to the above-described volume is differentiated depending on whether the above-described volume is the above-described virtual volume.

In addition, one mode of the present invention is a management computer to control one or tow or more storage systems that store data used by a host computer on a plurality of volumes, wherein the management computer has a memory, a processor to perform control, an interface to input and output data to the above-described storage system, and a volume allocation change program to change an allocation of a volume in the above-described storage system to a logical unit number of a volume that is recognized by the above-described host computer and an allocation of a virtual volume in which the above-described volume is allocated virtually to the above-described host computer; an identification information management table to manage identification information of the above-described storage system; a port management table to manage a port of the above-described storage system, which are provided in the above-described memory, and when security is set to a path between the above-described host computer and a volume that is provided to the above-described host computer, the above-described processor to execute the above-described volume allocation change program performs the control such that timing of notifying the above-described host computer of an access start to the above-described volume is differentiated depending on whether the above-described volume is the above-described virtual volume.

Also, one mode of the present invention is a volume allocation change method of a management computer to control one or two or more storage systems that store data used by a host computer on a plurality of volumes, wherein the control is performed such that timing of notifying the above-described host computer of an access start to the above described volume is differentiated depending on whether the above-described volume is the above-described virtual volume when security is set to a path between the above-described host computer and the volume that is provided to the above-described host computer.

Since the volume allocation change method of the present invention encrypts communication between a virtualized device (for example, a storage device which has a volume, a switch which does not have a volume, and the like) that provides a virtual volume to a host computer and a storage device that provides a volume which is provided by the virtualized volume as the virtual volume at the time of encrypting the communication in order for the host computer to use the virtual volume, secured communication from the host computer to the storage device can be realized by only setting the communication between the host computer and the virtualized device into the encrypted one.

In addition, it is possible to specify automatically the storage device that provides the volume which is provided as the virtual volume. Also, it is possible to automate a volume allocation change to a communication port that can support encrypted transfer in a storage device.

Furthermore, in case that a storage device that provides a volume corresponding to a virtual volume does not support encrypted transfer, it is possible to specify another storage device that has a communication port supporting encrypted transfer and to automate a migration of data of the volume into the specified another storage device. Accordingly, there also is an effect that a setting man-hour of an administrator is reduced and a setting mistake is prevented.

BRIEF DESCRIPTION OF THE DRAWINGS

FIG. 4 is a diagram showing one example of a form of a volume allocation table;

FIG. 5 is a diagram showing one example of a form of a virtual volume table;

FIG. 7 is a diagram showing one example of a form of a storage device management table;

FIG. 8 is a diagram showing one example of a form of a port management table;

FIG. 14 is one example of a command form for the volume allocation change program to perform communication with a storage device, wherein FIG. 14(a) is a lower-level storage disconnection command, FIG. 14(b) is an encryption method setting command, FIG. 14(c) is a lower-level storage connection command, FIG. 14(d) is a path registration change command, FIG. 14(e) is a volume allocation command, FIG. 14(f) is a virtual volume allocation command, FIG. 14(g) is a volume migration command, and FIG. 14(h) is a mapping change command;

DESCRIPTION OF THE PREFERRED EMBODIMENTS

Figure 1:
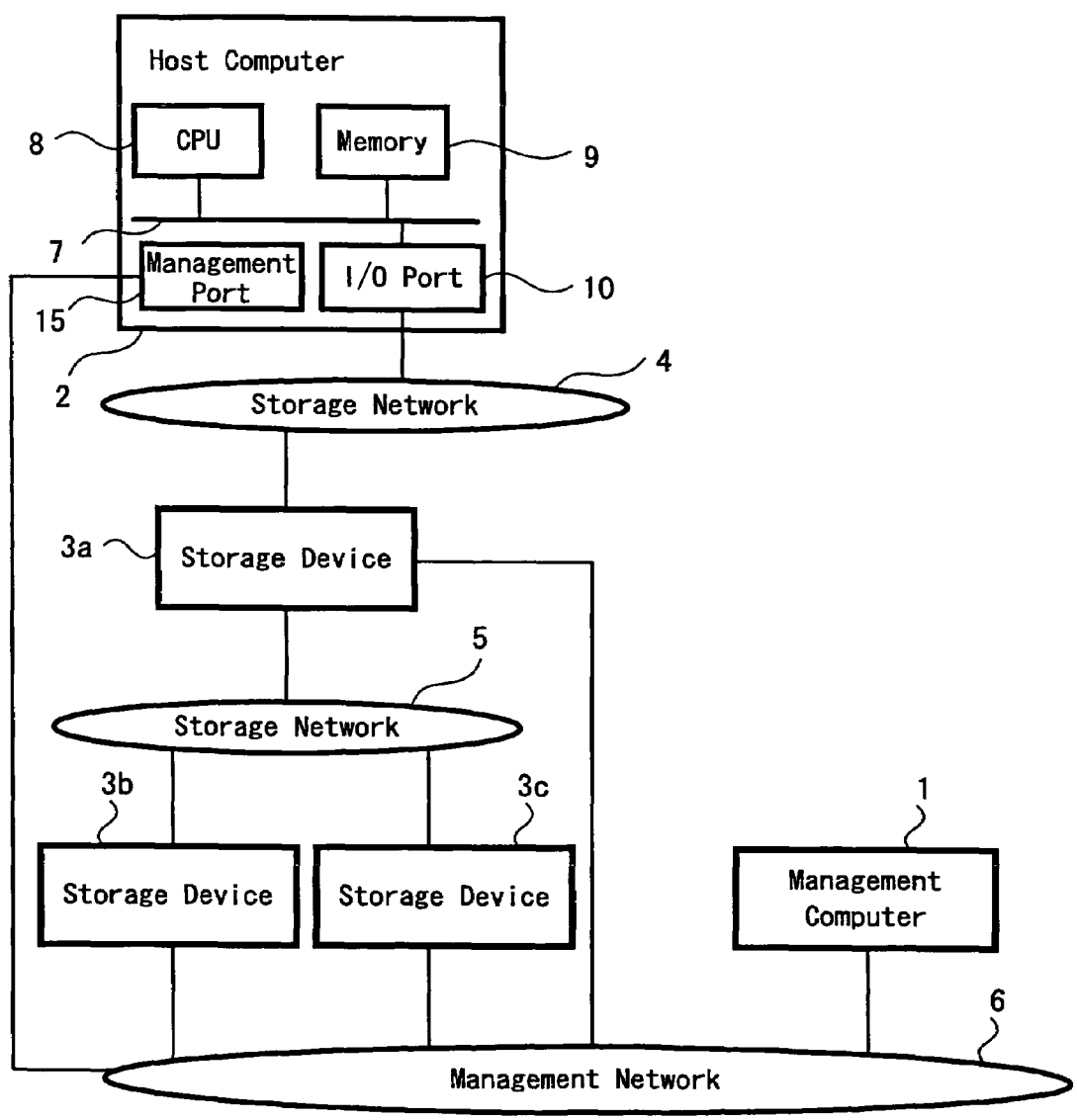
FIG. 1 is a diagram showing briefly a configuration of a computer system to which a volume allocation change method of the present invention is applied.

FIG. 1 is a configuration example of a system showing briefly a computer system to which the present embodiment is applied.

As shown in this figure, a computer system of the present embodiment has at least one host computer 2, a storage device (a virtualized device that provides a virtual volume to the host computer 2, such as a storage device which has a volume and a switch which does not have a volume, for example) 3a which is connected with this host computer 2 through a storage network 4, storage devices 3b and 3c (storage devices that provide one's own volume only) which are connected with this storage device 3a through a storage network 5, and a management computer 1 which is connected with the storage devices 3a, 3b, and 3c through a management network 6 such as an IP network, for example.

Here, the storage network 4 and storage network 5 may also be one single network, but are separated into two networks in the present embodiment for the sake of convenience. In addition, the storage network 4 and storage network 5 may be of the same protocol or of separate protocols. This protocol is a protocol to access a storage device, in which there are an iSCSI (Internet Small Computer System Interface) protocol on an IP network and an FC protocol on an FC (Fiber Channel) network, for example. In the present embodiment, a case in which the storage network 5 performs communication by using the iSCSI protocol is explained as an example.

The host computer 2 accesses data stored on the storage device 3a through the storage network 4. The host computer 2 has a CPU 8, a memory 9, an I/O port 10 to connect with the storage network 4, and an internal bus 7 to connect those 8 through 10. It should be noted that an operating system and an application to access the data stored on the storage device 3a are stored on the memory 9 although not illustrated. The CPU 8 executes those programs which are stored on the storage device 3a, and accesses a volume that is provided by the storage device 3a.

The storage devices 3b and 3c provide at least one volume to the storage device 3a. The storage device 3a provides the volume provided by the storage devices 3b and 3c to the host computer 2 as a virtual volume. In addition, the storage device 3a provides at least one volume of one's own to the host computer 2.

Here, when the storage device 3a does not have a real volume which can be provided to the host computer 2, and when only a virtual volume is provided, the storage device 3a is a higher-level storage device that provides the virtual volume, and the storage devices 3b and 3c are lower-level storage devices that provide a real volume corresponding to the virtual volume.

In this case, the storage devices 3b and 3c that provide the real volume corresponding to the virtual volume can enjoy features possessed by the storage device 3a that provides the virtual volume. On the contrary, when the storage device 3a has a real volume that can be directly provided to the host computer 2, and when a virtual volume is not provided, there is no distinction of a higher-level or lower-level between the storage device 3a and the storage devices 3b and 3c.

Figures 2, 3:
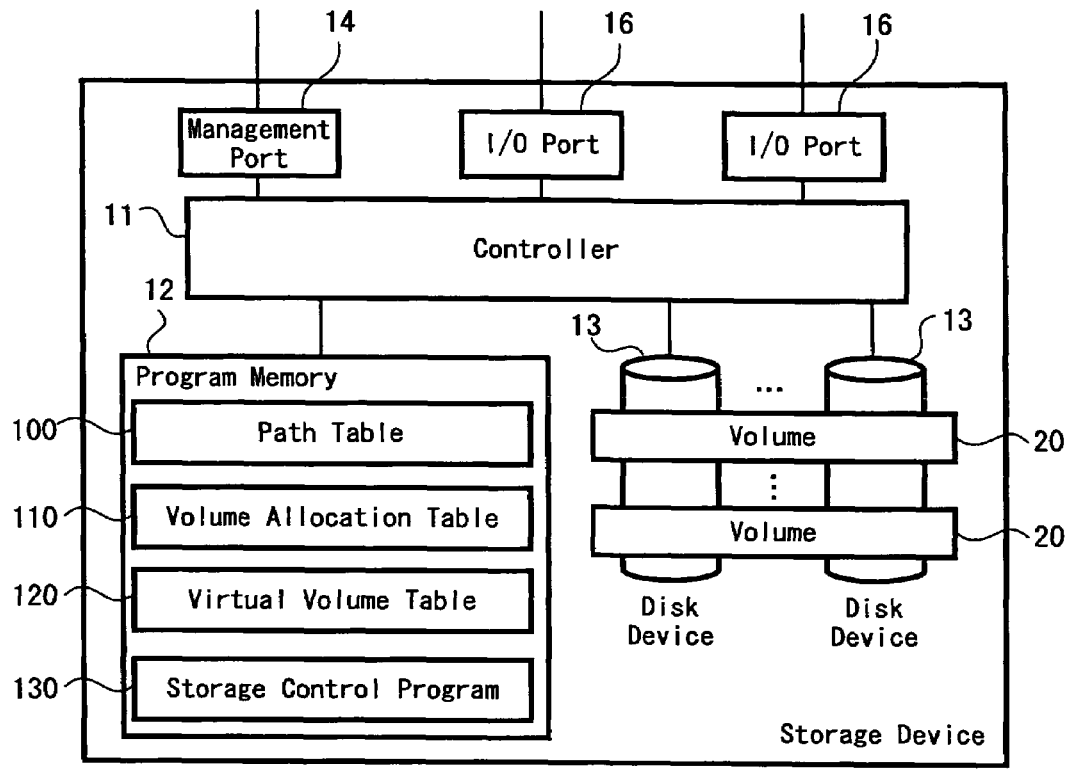
FIG. 2 is a diagram showing briefly a configuration of a storage device.
FIG. 3 is a diagram showing one example of a form of a path table.

FIG. 2 is an outline diagram of the storage devices 3a, 3b, and 3c. As shown in this figure, the storage devices 3a, 3b, and 3c are comprised of a management port 14 to connect with the management network 6, at least one I/O port 16 to connect with the storage networks 4 and 5, a controller 11 to perform control in the storage device, a program memory 12 that is used by the controller 11, and at least one disk device 13 that comprises at least one volume 20.

A path table 100 to retain information on paths that are logical data communication paths between the host computer 2 and the storage device 3a and between the storage device 3a and the storage devices 3b and 3c, a volume allocation table 110 to retain an allocation state of the volume 20, a virtual volume table 120 to retain necessary information to provide a volume that is provided by another storage device as a virtual volume, and a storage control program 130 to perform an allocation of a volume, path setting, and the like are stored on the program memory 12.

FIG. 3 is a diagram showing an example of registration contents of the path table 100. As shown in this figure, an entry is provided to each path in the path table 100. The entry has a field 101 to register a path ID for identifying a path uniquely, a field 102 to register a port ID for identifying an I/O port 16 of the storage device which is allocated to the path, a field 103 to register a device which is connected by using the path, a field 104 to register a port ID for identifying an I/O port used by the device which is connected by using the path, a field 105 to register a security setting state of the path, and a filed 106 to register a cryptographic key which is used at the time of performing encrypted transfer.

Here, a value showing whether or not the security setting such as the IPSec prescribed in the RFC2401 standard has been already executed is registered in the field 105.

For example, it is recognized that a path whose path ID 101 is "p1" is a case where a connection is made to a port whose port ID in a device "H1" of the connection destination 103 is "port 1" by using an I/O port 16 whose connection destination port ID 104 is "port 1" in the security setting 105 which is the IPSec and the cryptographic key 106 is "xxxxxx". In addition, it is recognized that a path whose path ID 101 is "p3" is a case where a connection is made to a port whose port ID in a device "ST-1" of the connection destination 103 is "port 1" by using an I/O port 16 whose connection destination port ID 104 is "port 1" in the security setting 105 which is the IPSec and the cryptographic key 106 is "yyyyyy".

Similarly, it is recognized that a path whose path ID 101 is "p2" is a case where a connection is made to a port whose port ID in a device "H2" of the connection destination 103 is "port 1" by using an I/O port 16 whose connection destination port ID 104 is "port 1" without the security setting 105. In addition, it is recognized that a path whose path ID 101 is "p4" is a case where a connection is made to a port whose port ID in a device "ST-2" of the connection destination 103 is "port 1" by using an I/O port 16 whose connection destination port ID 104 is "port 1" without the security setting 105.

FIG. 4 is a diagram showing an example of registration contents of the volume allocation table 110. As shown in this figure, an entry is provided to each volume in the volume allocation table 110. The entry has a field 111 to register a volume ID for identifying uniquely a volume in a storage device 3, a field 112 to register a path ID for identifying a path to which the volume is allocated, a field 113 to register a logical unit number (LUN) of the volume, and a field 114 to register a virtual flag showing whether or not the volume is a virtual volume that is provided from another storage.

Here, "1" is registered in the field 114 when a volume is a virtual volume, and "0" is registered when a volume is a real volume to the contrary. This value is set by the controller 11 at the time of registering a virtual volume.

For example, it is recognized that a volume whose volume ID 111 is "VOL-V01" is one wherein the path ID 112 is allocated to "p1", the LUN 113 is "1", and the virtual flag 114 shows a virtual volume. It is recognized that a volume whose volume ID 111 is "VOL-V02" is one wherein the path ID 112 is allocated to "p1", the LUN 113 is "2", and the virtual flag 114 shows a virtual volume.

In addition, it is recognized that a volume whose volume ID 111 is "VOL-R01" is one wherein the path ID 112 is allocated to "p2", the LUN 113 is "1", and the virtual flag 114 shows a real volume. It is recognized that a volume whose volume ID 111 is "VOL-V03" is one wherein the path ID 112 is allocated to "p2", the LUN 113 is "2", and the virtual flag 114 shows a virtual volume.

FIG. 5 is a diagram showing an example of registration contents of the virtual volume table 120. As shown in this figure, an entry is provided to each virtual volume in the virtual volume table 120. The entry has a field 121 to register a virtual volume ID for identifying a virtual volume in a storage device 3, a field 122 to register a path ID for identifying a path to a storage device that provides a volume corresponding to the virtual volume, and a field 123 to register a volume ID of a storage device corresponding to the virtual volume.

For example, it is recognized that a virtual volume whose virtual volume ID 121 is "VOL-V01" is a volume whose volume ID 123 is "VOL-1" which is provided by a storage device connected by a path whose path ID 122 is "p3". It is recognized that a virtual volume whose virtual volume ID 121 is "VOL-V02" is a volume whose volume ID 123 is "VOL-2" which is provided by a storage device connected by a path whose path ID 122 is "p3".

In addition, it is recognized that a virtual volume whose virtual volume ID 121 is "VOL-V03" is a volume whose volume ID 123 is "VOL-1" which is provided by a storage device connected by a path whose path ID 122 is "p4". It is recognized that a virtual volume whose virtual volume ID 121 is "VOL-V04" is a volume whose volume ID 123 is "VOL-2" which is provided by a storage device connected by a path whose path ID 122 is "p4".

When an access command to a virtual volume is obtained from the host computer 2, the storage device 3a refers to the virtual volume table 120 and relays this access command to a corresponding path.

Figure 6:
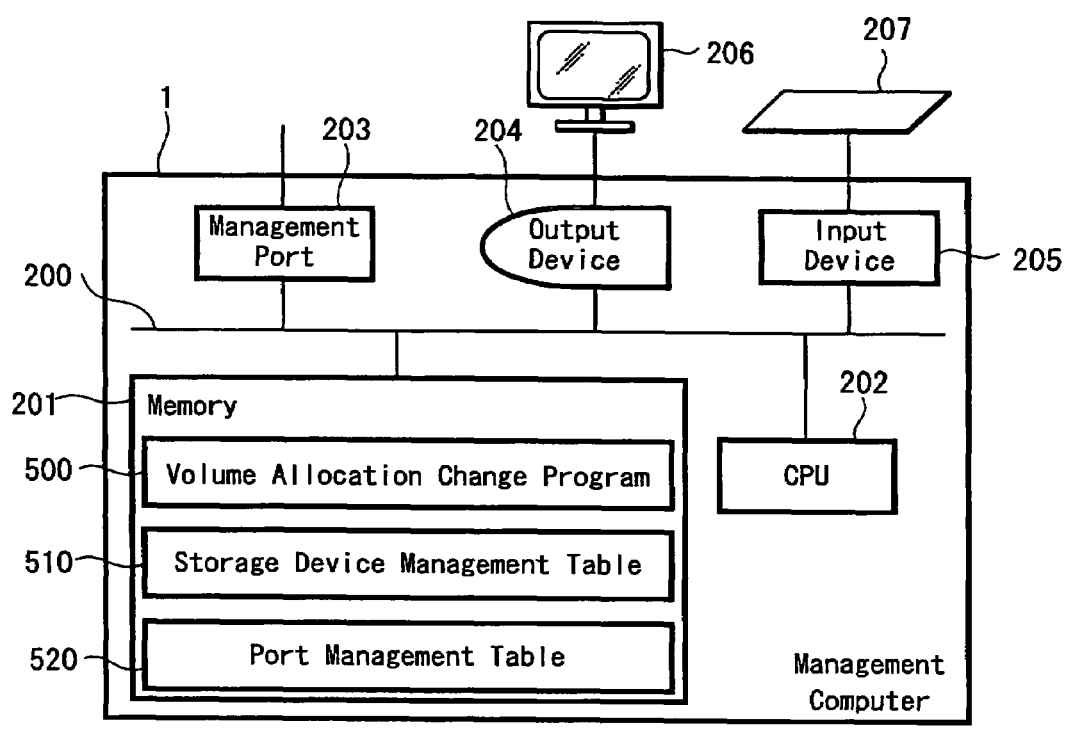
FIG. 6 is a diagram showing briefly a configuration of a management computer.

FIG. 6 is an outline diagram of the management computer 1. As shown in this figure, the management computer 1 is comprised of a management port 203 to connect with the management network, an output device 204 to output various information to a display device 206, an input device 205 to process input information from a keyboard 207 and the like, a CPU 202, a memory 201 to be used by the CPU 202, and an internal bus 200 to connect those 201 through 205.

The memory 201 has an operating system which is not illustrated though, a volume allocation change program 500, a storage device management table 510, and a port management table 520. The CPU 202 performs each processing of a volume allocation change method of the present embodiment, which is described hereinafter, by executing the volume allocation change program 500.

Classes of all storage devices 3 comprising the computer system and identification information to connect with the management port 14 are stored on the storage device management table 510.

FIG. 7 shows an example of registration contents of the storage device management table 510. As shown in this figure, an entry is provided to each storage device comprising the computer system in the storage device management table 510.

The entry has a field 511 to register a storage name for identifying a storage device 3 that becomes an object of each entry, a field 512 to register a class whether the storage device 3 is a "higher-level" storage device that provides a virtual volume to the host computer 2 or a "lower-level" storage device that provides a real volume to another storage device 3, and a field 513 to register identification information for connecting to the management port 14 of the storage device 3. In the present embodiment, an IP address is registered in the field 513 since the IP network is used for the management network 6.

For example, it is recognized that a storage device whose storage name 511 is "ST-0" is a storage device in which a value of the class 512 is "higher-level" and which provides a virtual volume providing a volume 20 to the host computer 2 as the virtual volume, and it is recognized from a value of the IP address 513 that an IP address to connect with the management port 14 is "100. 100. 100. 100".

It is recognized that a storage device whose storage name 511 is "ST-1" is a storage device in which a value of the class 512 is "lower-level" and which provides a real volume corresponding to a virtual volume by providing a volume 20 as the real volume to another storage device 3, and it is recognized from a value of the IP address 513 that an IP address to connect with the management port 14 is "100. 100. 100. 101".

It is recognized that a storage device whose storage name 511 is "ST-2" is a storage device in which a value of the class 512 is "lower-level" and which provides a real volume corresponding to a virtual volume by providing a volume 20 as the real volume to another storage device 3, and it is recognized from a value of the IP address 513 that an IP address to connect with the management port 14 is "100. 100. 100. 102".

The volume allocation change program 500 refers to information of the storage device management table 510 as needs arise and carries out a connection with the management port of the storage device 3.

Information on the I/O port 16 to connect with the storage networks 4 and 5 of the storage device 3 comprising the computer system is stored on the port management table 520.

FIG. 8 shows an example of registration contents of the port management table 520. As shown in this figure, an entry is provided to each I/O port 16 of the storage device 3 in the port management table 520. The entry has a field 521 to register a storage name for identifying a storage device 3, a field 522 to register a port ID for identifying an I/O port 16, and a field 523 to register security method assigned to this port.

For example, it is recognized from a first entry that an I/O port 16 to which the storage name 521 is "ST-1" and the port ID 522 of the storage device is "Port 1" supports the IPSec standard as the security method 523. It is recognized from a second entry that an I/O port 16 to which the storage name 521 is "ST-1" and the port ID 522 of the storage device is "Port 2" supports IPSec standard as the security method 523.

Similarly, it is recognized from a third entry that an I/O port 16 to which the storage name 521 is "ST-2" and the port ID 522 of the storage device is "Port 1" has nothing set as the security method 523. It is recognized from a fourth entry that an I/O port 16 to which the storage name 521 is "ST-2" and the port ID 522 of the storage device is "Port 2" supports the IPSec standard as the security method 523.

Next, a processing procedure of the CPU 202 that executes the volume allocation change program 500 in order to realize the volume allocation change method of the present embodiment is explained by using FIG. 9 through FIG. 19.

Figure 9:
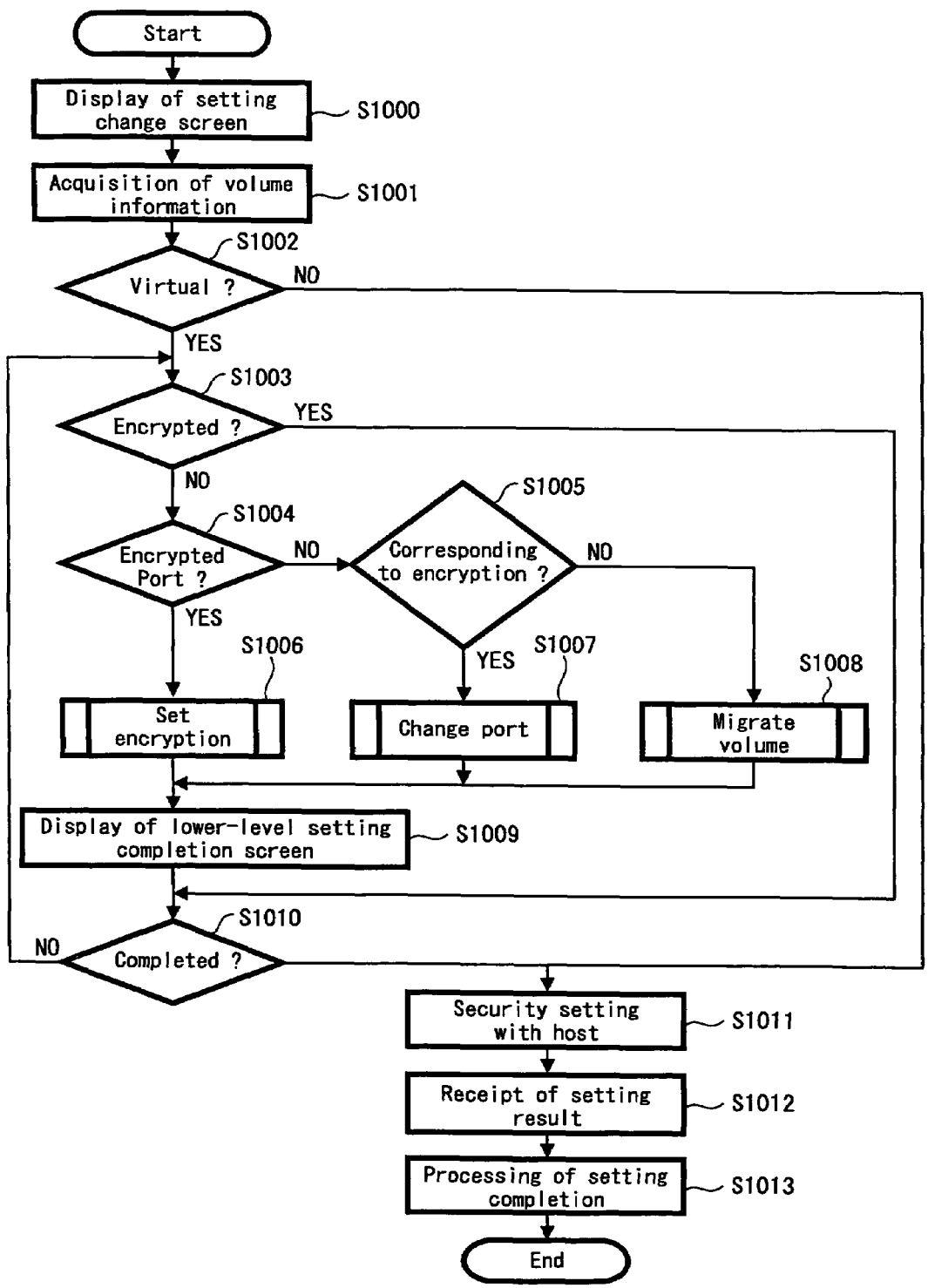
FIG. 9 is a diagram showing a process flow of a volume allocation change program.

FIG. 9 is a process flow in which the CPU 202 executing the volume allocation change program 500 changes an allocation of a volume. The CPU 202 executing the volume allocation change program operates at the time of changing security setting of a communication form between the host computer 2 and the storage device 3a.

Figure 15:
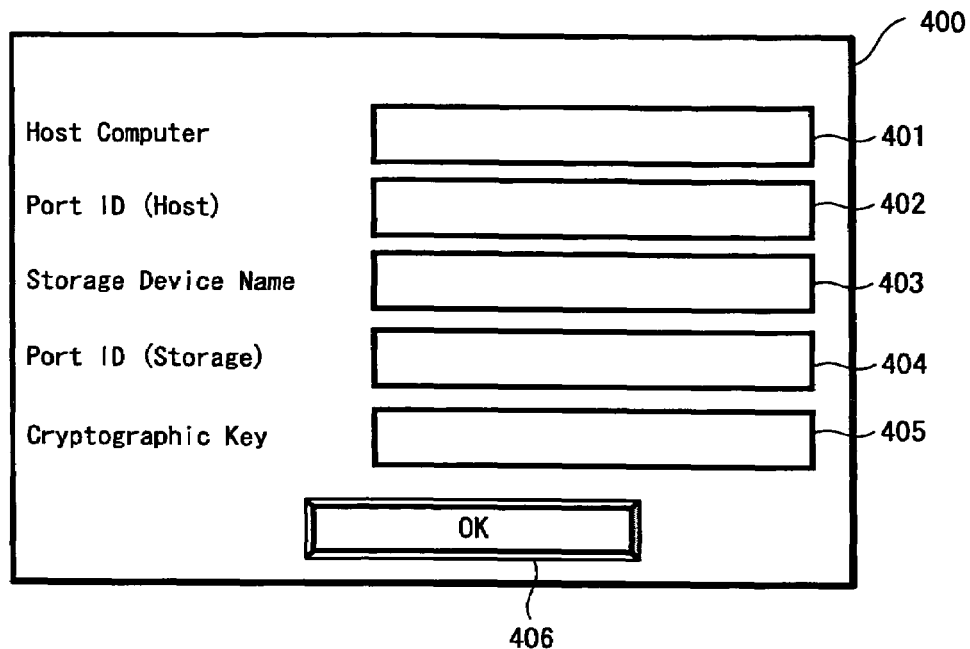
FIG. 15 is one example of a form of a setting change screen.

First, the CPU 202 displays a setting change screen 400 to input contents of change in the display device 206 (step S1000). FIG. 15 shows one example of the setting change screen 400. This setting change screen 400 is an input screen to input names 401 and 403 of the host computer 2 and storage device 3 to which communication is encrypted, port IDs 402 and 404 of ports to connect a path to which the communication is encrypted, and a cryptographic key 405 that is used for encryption.

An administrator inputs a name of the host computer 2 into a field of the numeral 401, inputs a port ID for identifying an I/O port used by the host computer into a field of the numeral 402, inputs a name of the storage device 3a into a field of the numeral 403, inputs a port ID for identifying an I/O port used by the storage device 3a into a field of the numeral 404, and inputs a cryptographic key into a field of the numeral 405 by using the keyboard 207, and then depresses an OK button 406. When data relating to the fields 401 through 405 are input in the setting change screen 400 and the OK button 406 is selected, the volume allocation change program moves to a process of step S1001.

Returning to FIG. 9, the CPU 202 obtains an IP address of the management port 14 of the storage device input into the field 403 from the field 513 of the storage device management table 510, and connects to this IP address through the management network 6 (step S1001). Next, the CPU 202 obtains an entry of a path corresponding to the host computer 401, port ID (host) 402, and port ID (storage) 404 of the setting change screen 400 by referring to the path table 100 shown in FIG. 3 which is retained in the storage device 3a.

In case that a value of the host computer 401 is "H2", a value of the port ID (host) 402 is "Port 1", and a value input into the field of the port ID (storage) 404 is "Port 1", for example, the CPU 202 obtains an entry in which the path ID 101 of FIG. 3 is "p2". Next, the CPU 202 refers to the volume allocation table 110 shown in FIG. 4 and obtains all entries in which a value of the path ID 112 corresponds to the path ID 101 of the entry obtained from the path table 100 of FIG. 3. In case that the path ID 101 of the entry obtained from the path table of FIG. 3 is "p2", for example, the CPU 202 obtains the entries in which the volume ID 111 is "VOL-R01" and "VOL-V03".

Next, the CPU 202 judges from information of the virtual flag 114 in the obtained entry of the volume allocation table of FIG. 4 whether a volume indicated by this virtual flag 114 is a virtual volume (step S1002). When the volume is not the virtual volume, more specifically when the value of the virtual flag 114 is "0" for all the entries, the process of the CPU 202 makes a transition to step S1011. When at least one virtual volume exists, more specifically when there is at least one entry in which the value of the virtual flag 114 is "1", the process of the CPU 202 makes a transition to step S1003.

When at least one virtual volume exists in step S1002, the CPU 202 obtains the entry of the virtual volume that is obtained in step S1002 from the virtual volume table 120 of the storage device 3a, and obtains a path ID for identifying a path to use the virtual volume by referring to a value of the field 122 of the obtained entry.

Next, the CPU 202 refers to the path table 100 and judges from a value of the field 105 in the entry of the path ID obtained by referring to the virtual volume table whether communication between the storage device 3a and the storage devices 3b and 3c providing a real volume that is provided as the virtual volume is encrypted transfer (step S1003).

For example, the CPU 202 judges that the encrypted transfer based on the IPSec standard is performed when a value of the security setting 105 of FIG. 3 is yes (IPSec) and the encrypted transfer is not performed when the value is "No". As a result of this judgment, the process of the CPU 202 makes a transition to step S1010 when the encrypted transfer is performed and makes a transition to step S1004 when the encrypted transfer is not performed.

When the encrypted transfer is not performed in step S1003, the CPU 202 confirms whether the communication port used between the storage device 3a and the storage devices 3b and 3c that provide the virtual volume corresponds to the encrypted transfer at this point of time (step S1004). For this purpose, the CPU 202 specifies the storage devices 3b and 3c which are connected by this path and an I/O port 16 which is used for the connection of the path by the storage device 3b and 3c from the connection destination 103 and connection destination port ID 104 of the path table 100 that is obtained in step S1003.

For example, in case that the path ID 101 is "p3", CPU 202 can recognize from the connection destination 103 and connection destination port ID 104 that the connection is made with the storage device 3a by an I/O port 16 whose port ID 102 is "port 2" to which the storage name of the connection destination 103 is "ST-1". Next, the CPU 202 judges whether this port I/O 16 supports the encrypted transfer by referring to the port management table 520 shown in FIG. 8 and by referring to the security method 523 of the entry in which values of the storage name 521 and port ID 522 are the storage name and port ID specified in the preceding process.

When a value of the security method 523 is "No", the I/O port shown in this entry does not support the encrypted transfer. When the security method 523 supports an encryption method, a corresponding encrypted transfer method, which is the IPSec standard for example, is stored on the security method 523, and therefore the CPU 202 makes the judgment by referring to this value. As a result of this judgment, the process of the CPU 202 makes a transition to step S1005 when the I/O port 16 does not support the encrypted transfer, but when the I/O port 16 supports the encrypted transfer, the CPU 202 executes step S1006 to change the communication into the encrypted transfer and the process of the CPU 202 makes a transition to step S1009. The process of step S1006 is described later.

When the I/O port 16 does not support the encrypted transfer in step S1004, the CPU 202 judges whether there is an I/O port supporting the encrypted transfer in the storage device 3b and 3c that provide the real volume (step S1005). For this purpose, the CPU 202 confirms values of the security method 523 of all the entries that have the same storage name in the storage name 521 of the port management table 520 of FIG. 8, and the process of the CPU 202 makes a transition to step S1009 after the CPU 202 executes step S1007 when there is an entry in which the encryption method is supported. When there is no entry in which the encrypted transfer is supported, the CPU 202 executes step S1008 and the process of the CPU 202 makes a transition to step S1009.

When there is a port supporting the encryption method in step S1005, the CPU 202 carries out setting of a port change in order to provide a real volume using the encrypted transfer to a storage device that provides a virtual volume by using the I/O port 16 supporting the encrypted transfer in the storage device that provides the real volume corresponding to the virtual volume (step S1007). Details thereof are described later.

When there is no port supporting the encryption method in step S1005, the CPU 202 migrates contents of the volume to another storage device supporting the encrypted transfer, which is different from the storage device that provides the real volume corresponding to the virtual volume, and the CPU 202 carries out setting to perform the encrypted transfer between another storage device of the transfer destination and the storage device that provides the virtual volume (step S1008). Details thereof are described later.

Figure 18:
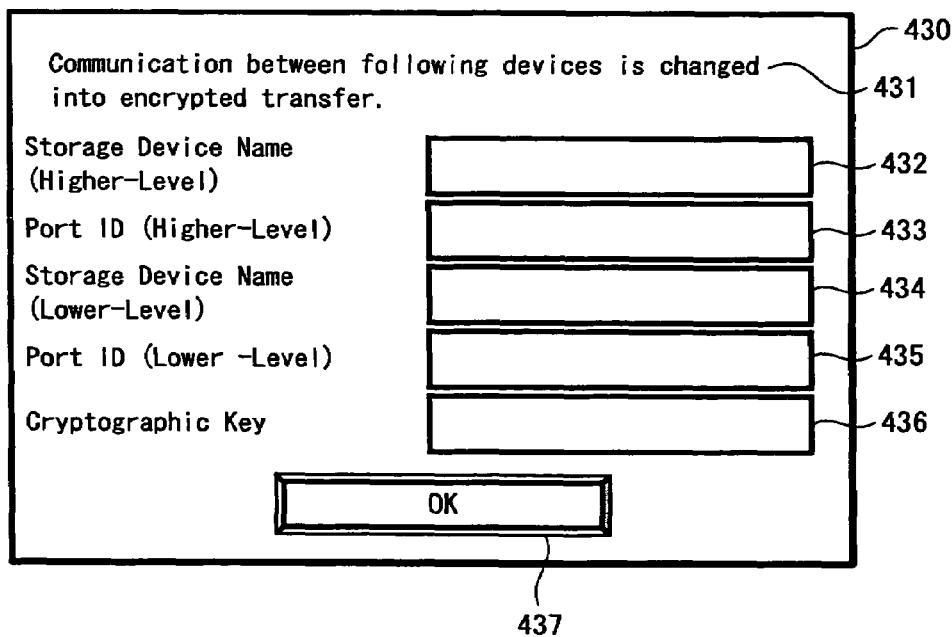
FIG. 18 is one example of a form of an inter-storage communication method change completion screen.

When the processing of step S1006, step S1007, and step S1008 is completed, the CPU 202 displays an inter-storage communication method change completion screen in the display device 206 (step S1009). FIG. 18 is one example of the inter-storage communication method change completion screen. Storage names 432 and 434 for identifying the storage device 3a that provides the virtual volume and the storage devices 3b and 3c that provide the real volume corresponding to the virtual volume and to which the communication method is changed, port IDs 433 and 435 for identifying the I/O ports 16 that are used by the communication of the changed communication method, and a cryptographic key 436 for encryption are displayed in an inter-storage communication method change completion screen 430.

A storage name of the storage device 3a that provides the virtual volume is displayed in the field 432, a port ID of the I/O port 16 of the storage device 3a that provides the virtual volume is displayed in the field 433, a storage name of the storage devices 3b and 3c that provide the real volume corresponding to the virtual volume is displayed in the field 434, a port ID of the I/O port 16 of the storage devices 3b and 3c that provide the real volume corresponding to the virtual volume is displayed in the field 435, and the cryptographic key for encryption is displayed in the field 436. When a button 437 is depressed in this screen, the process of the CPU 202 makes a transition to step S1010.

Returning to FIG. 9, the CPU 202 judges whether the processing of steps S1003 through S1009 is completed to all the virtual volumes specified in step S1002 (step S1010). The process of the CPU 202 makes a transition to step S1011 when the processing is completed to all the virtual volumes, and the process of the CPU 202 makes a transition to step S1003 when there is a virtual volume to which the processing is not completed.

When the processing is completed to all the virtual volumes in step S1010, or when the processing is judged not for the virtual volume in step S1002, the CPU 202 transmits an encrypted transfer setting command 310 to the storage 3a and sets the encrypted transfer to the communication with the host computer 2 (step S1011). The CPU 202 receives a result in which the storage device 3a executes the process corresponding to the encrypted transfer setting command 310 (step S1012). Last, the CPU 202 outputs a setting completion screen 440 into the display device 206 (step S1013).

Figure 19:
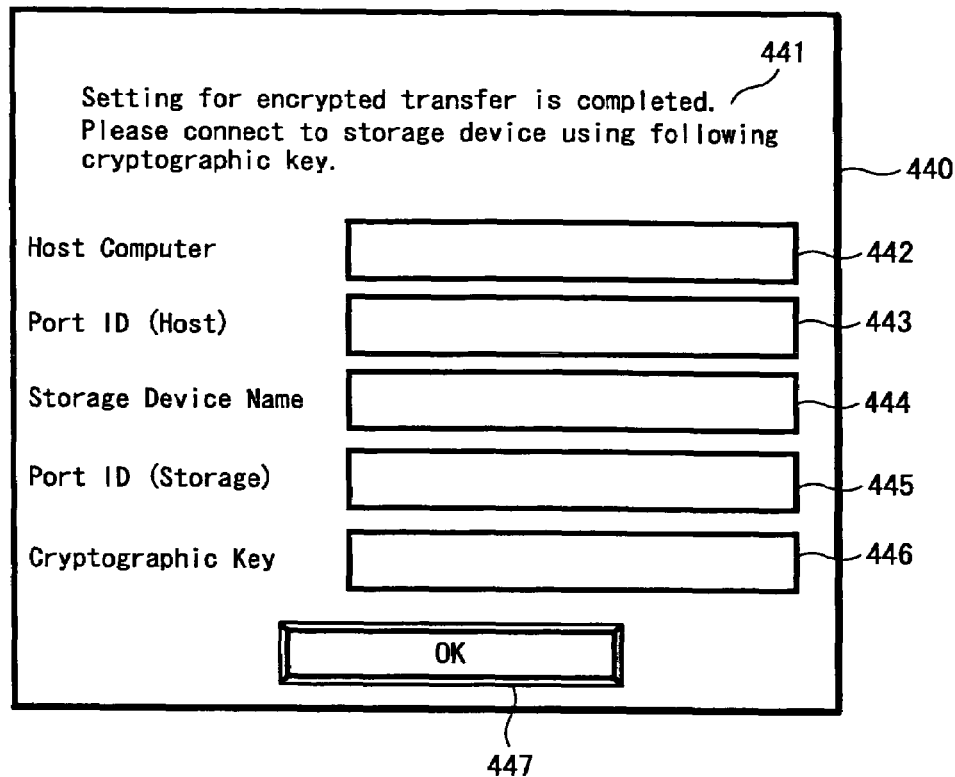
FIG. 19 is one example of a form of a setting completion screen.

In addition, the CPU 202 notifies the host computer 2 through the management network of the effect that the setting is completed, and ends the processing. FIG. 19 is one example of the setting completion screen 440. In the setting completion screen 440, names of the host computer 2 and storage device 3 are displayed in a field 442 and field 444, port IDs of the I/O ports of the host computer 2 to connect the path in which the communication is encrypted and storage device 3a that provides the virtual volume are displayed in a field 443 and field 445, and a key that is used for the encrypted transfer is displayed in a field 446. An administrator performs the setting of the encrypted transfer to the host computer 2 by referring to this information.

Figure 10:
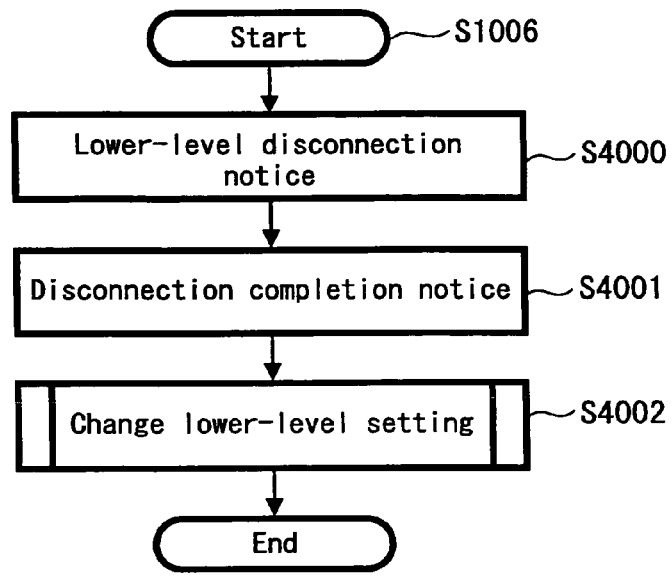
FIG. 10 is a diagram showing a process flow in which the volume allocation change program disconnects a connection path between a storage device that provides a virtual volume and a storage device that provides a real volume corresponding to the virtual volume and makes a reconnection using encrypted transfer.

Next, processing to disconnect the path of step S1006 of FIG. 9 and to make a reconnection using encrypted transfer is explained by using FIG. 10. In this processing, when the I/O port used by the communication between the storage device 3a that provides the virtual volume and the storage devices 3b and 3c that provide the real volume corresponding to the virtual volume supports the encrypted transfer, the CPU 202 changes this communication into the encrypted transfer.

First, the CPU 202 transmits a lower-level storage disconnection command 300 to the storage device 3a that provides the virtual volume in order to disconnect the path for the storage device that provides the real volume corresponding to the virtual volume (step S4000). FIG. 14(a) is one example of the lower-level storage disconnection command 300. The lower-level storage disconnection command 300 has a field 301 to show that this command is a lower-level storage disconnection command and a field 302 to set a path ID for identifying a path to be disconnected.

Returning to FIG. 10, the storage device 3a that provides the virtual volume disconnects the path specified in the field 301 upon receipt of the storage disconnection command.

The CPU 202 receives a disconnection completion notice showing the effect that the disconnection is completed to the storage devices 3b and 3c that provide the real volume corresponding to the virtual volume from the storage device 3a that provides the virtual volume (step S4001).

Next, the CPU 202 sets the communication of the path disconnected in step S1008 into the encrypted transfer for the storage devices 3b and 3c that provide the real volume corresponding to the virtual volume, and the CPU 202 uses the encrypted transfer to connect the storage device that provides the virtual volume and the storage device that provides the real volume corresponding to the virtual volume and ends the processing (step S4002).

Figure 11:
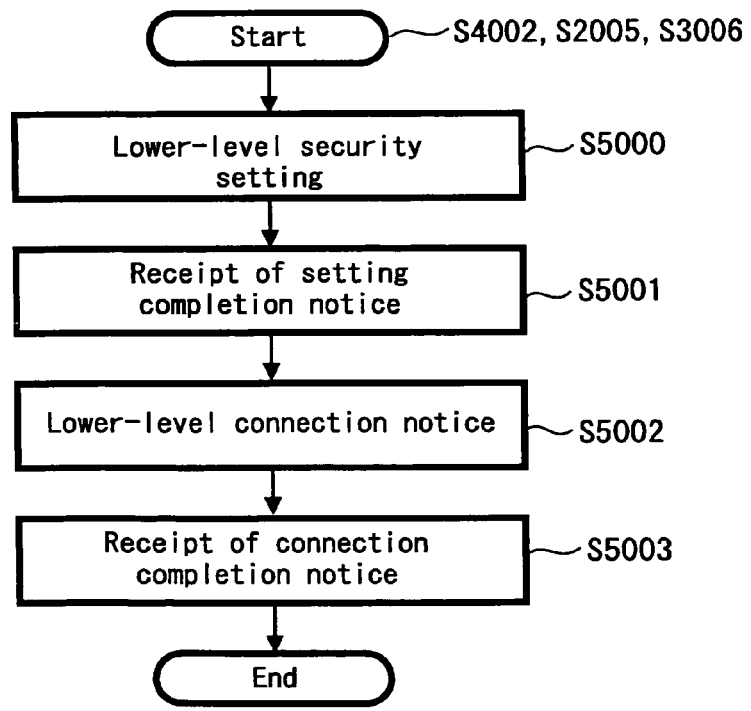
FIG. 11 is a diagram showing a process flow in which the volume allocation change program changes a connection path between a storage device that provides a virtual volume and a storage device that provides a real volume corresponding to the virtual volume into encrypted transfer.

FIG. 11 is a diagram showing a process flow to change the path of step S4002 of FIG. 10 into the encrypted transfer. First, the CPU 202 transmits an encryption method setting command 310 to the storage devices 3b and 3c that provide the real volume corresponding to the virtual volume (step S5000). FIG. 14(b) is one example of the encryption method setting command 310. The encryption method setting command 310 is comprised of a field 311 to show that this command is the encryption method setting command 310, a field 312 to set a path ID for identifying a path that is changed into the encrypted transfer, a field 313 to set a method of the encryption, and a field 314 to set a key that is used for the encryption.

The storage devices 3b and 3c that provide the real volume corresponding to the virtual volume sets communication of the path ID specified in the field 311 such that the encrypted transfer is performed in the encryption method which is specified in the field 312 by using the key specified in the field 313.

It should be noted that the CPU obtains the path ID which is notified to the storage devices 3b and 3c that provide the real volume corresponding to the virtual volume as follows. First, the CPU 202 of the management computer 1 obtains an IP address of the management port 14 of the storage devices 3b and 3c disconnected in step S1008 of FIG. 9 that provide the real volume corresponding to the virtual volume by referring to the storage device management table 510 in order to connect to this management port 14, and the CPU 202 obtains a path ID corresponding to a connection destination by referring to the path table 100 of FIG. 3. In addition, the CPU 202 sets a value that is input in the cryptographic key 405 of the setting change screen 400 of FIG. 15 displayed in step S1000 of FIG. 9 into the cryptographic key used for the encrypted transfer which is set in the field 314.

Returning to FIG. 11, the CPU 202 receives a notice showing the effect that encryption setting is performed in accordance with the contents of the encryption setting command 310 from the storage devices 3b and 3c that provide the real volume corresponding to the virtual volume (step S5001).

Next, the CPU 202 transmits a command to the storage device 3a that provides the virtual volume to connect with a storage device that provides a real volume corresponding to the virtual volume in the encryption method which is set in step S5000 to the storage devices 3b and 3c that provide the real volume corresponding to the virtual volume. More specifically, the CPU 202 transmits a lower-level storage connection command 320 (step S5002).

FIG. 14(c) is one example of the lower-level storage connection command 320. The lower-level storage connection command 320 is comprised of a field 321 to show that this command is a lower-level storage connection command, a field 322 to set a path ID for identifying a path to be connected, a field 323 to set an encryption method, and a field 324 to set a key that is used for the encryption.

Returning to FIG. 11, the storage device 3a that provide the virtual volume connects with the storage devices 3b and 3c that provide the real volume corresponding to the virtual volume in accordance with the contents of the lower-level storage connection command 320. Last, the CPU 202 receives a notice showing the effect that the connection is made with the storage devices 3b and 3c that provide the real volume corresponding to the virtual volume from the storage device 3a that provides the virtual volume, and ends the processing (step S5003).

Figure 12:
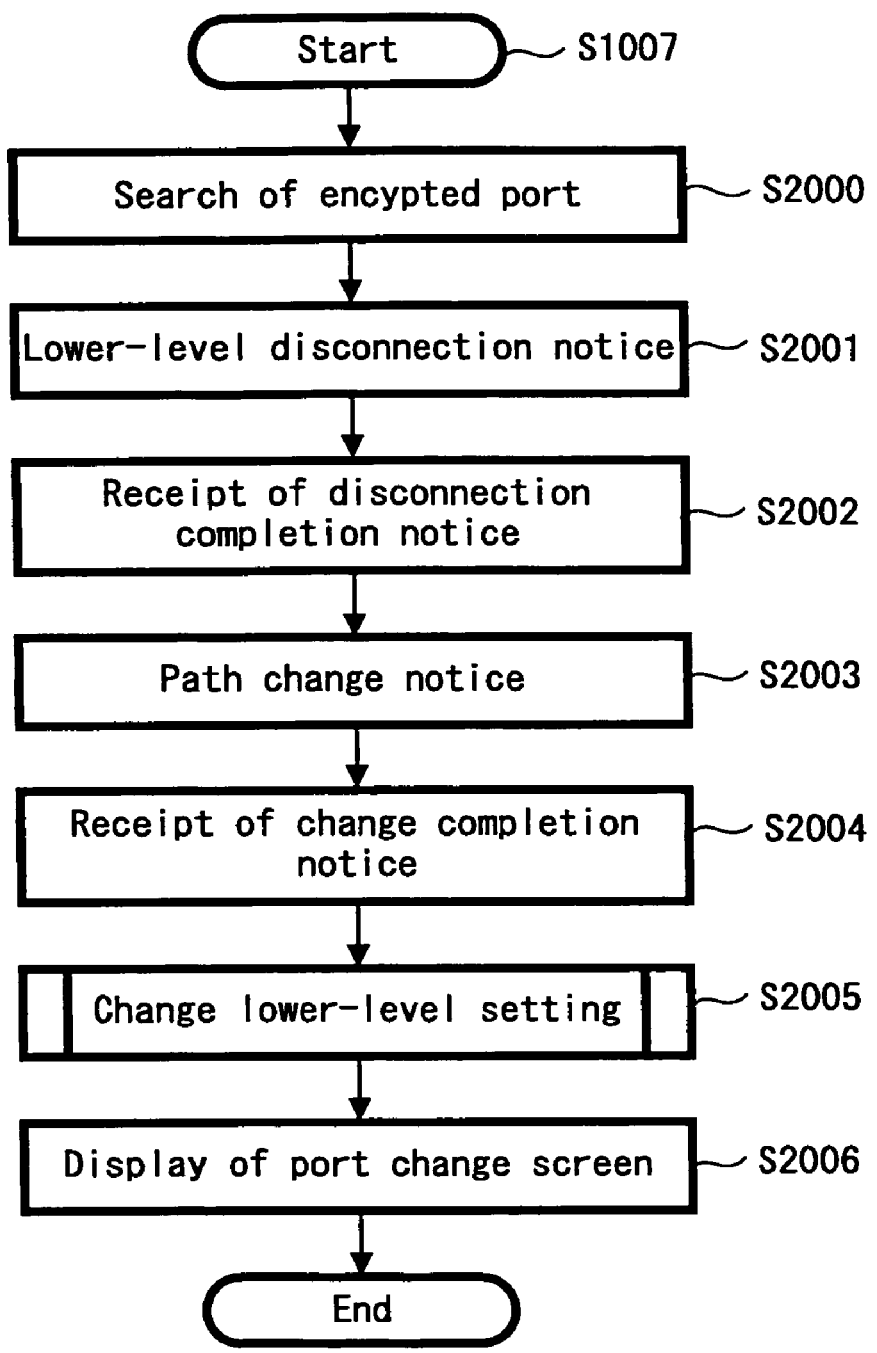
FIG. 12 is a diagram showing a process flow in which the volume allocation change program changes a port that is used by a path between a storage device that provides a virtual volume and a storage device that provides a real volume corresponding to the virtual volume.

Next, processing to change the port which is used by the path of S1007 of FIG. 8 is explained by referring to FIG. 12. FIG. 12 is a process flow to change a path to the I/O port supporting the encrypted transfer when the I/O port 16 of the storage devices 3b and 3c that provide the actual volume corresponding to the virtual volume, which is used by the path between the storage device 3a that provides the virtual volume and the storage devices 3b and 3c that provide the real volume corresponding to the virtual volume, does not support the encrypted transfer.

First, the CPU 202 searches for the I/O port 16 supporting the encrypted transfer in the storage devices 3b and 3c that provide the real volume corresponding to the virtual volume (step S2000). More specifically, the CPU 202 obtains a port ID that is registered in the field 522 of the entry in which the encrypted transfer method is registered in the field 523 of the port management table 520.

Next, the CPU 202 transmits the lower-level storage disconnection command 300 to disconnect the path specified by step S1003 to the storage device 3a that provides the virtual volume (step S2001). The CPU 202 receives a notice showing the effect that the disconnection is completed to the storage devices 3b and 3c that provide the real volume corresponding to the virtual volume from the storage device 3a that provides the virtual volume (step S2002).

Next, the CPU 202 transmits a path registration change command 330 to the storage device 3a that provides the virtual volume and storage devices 3b and 3c that provide the real volume corresponding to the virtual volume in order to change the allocated I/O port 16 in the storage devices 3b and 3c that provide the real volume corresponding to the virtual volume for the path that is disconnected in step S2001 (step S2003).

FIG. 14(d) is one example of a form of the path registration change command 330. The path registration change command 330 has a field 331 to show that this command is a path registration change command, a field 332 to show a path ID for identifying a path that becomes an object of this command, a field 333 to show a port ID for identifying an I/O port 16 that is used by the path, a field 334 to show a device name of a connection destination of the path, and a field 335 to show a port ID for identifying an I/O port 16 of a connection destination device.

Returning to FIG. 12, the storage devices 3a, 3b, and 3c that provide the virtual volume, upon receipt of this path registration change command, change an entry of a corresponding path of the path table 100. The CPU 202 receives a notice showing the effect that the processing of the path registration change command 330 is completed from the storage device 3a that provides the virtual volume (step S2004).

Next, in step S2005, the CPU 202 sets the communication of the changed path in step S2003 into the encrypted transfer for the storage devices 3b and 3c that provide the real volume corresponding to the virtual volume, and uses the encrypted transfer to connect the storage device that provides the virtual volume and the storage device that provides the real volume corresponding to the virtual volume. Since this processing is the above-described processing of FIG. 11, an explanation thereof is omitted here.

Figure 16:
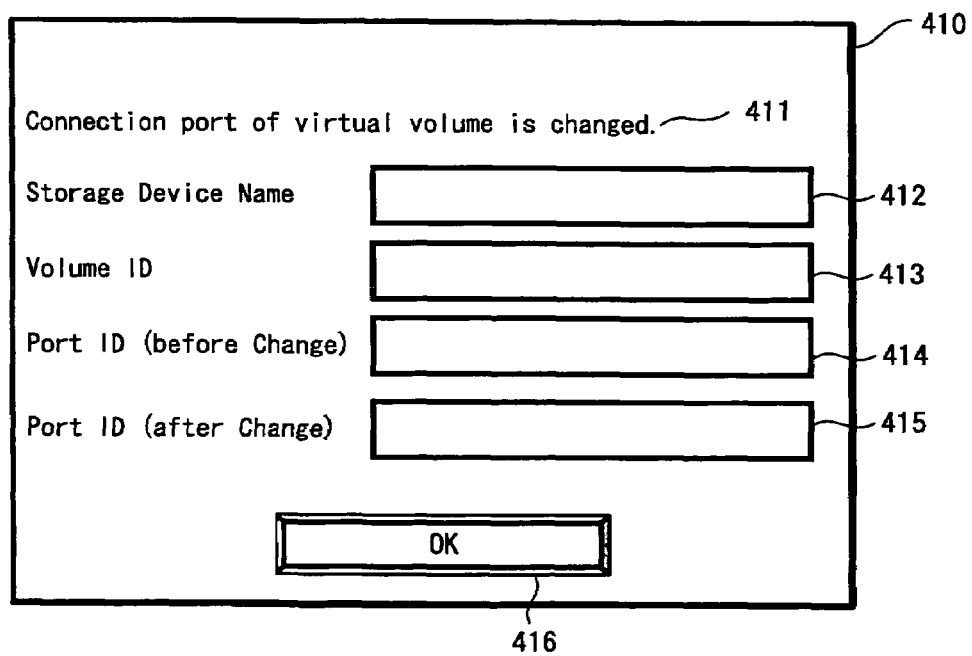
FIG. 16 is one example of a form of a port change screen.

Lat, the CPU 202 displays a port change screen 410 in the display device 206, and makes a transition to S1009 of FIG. 8 (step S2006). FIG. 16 is one example of the port change screen 410.

In the port change screen 410, a name of a storage device that provides a real volume corresponding to a virtual volume for the storage device 3a that provides the virtual volume is displayed in a field 412, a volume ID of a volume to access through a path to which an allocation of a port is changed is displayed in a field 413, and a port ID of an I/O port 16 before the change and a port ID of an I/O port 16 after the change are displayed in a field 414 and field 415.

Figure 13:
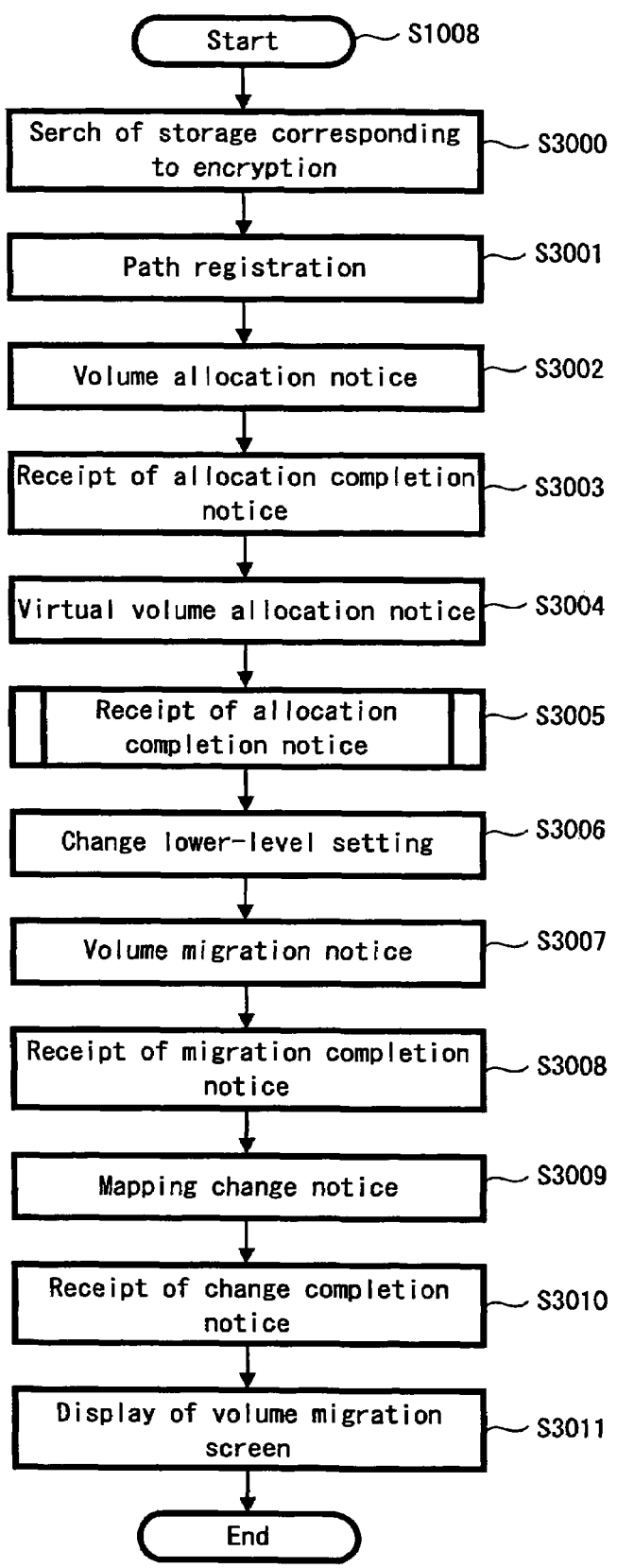
FIG. 13 is a diagram showing a process flow in which the volume allocation change program migrates a volume corresponding to a virtual volume into a storage device that provides a real volume corresponding to another virtual volume.
Figure 14:
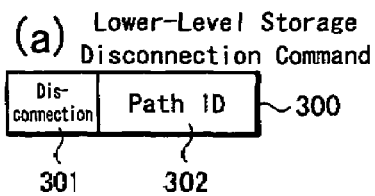
Figure 14:
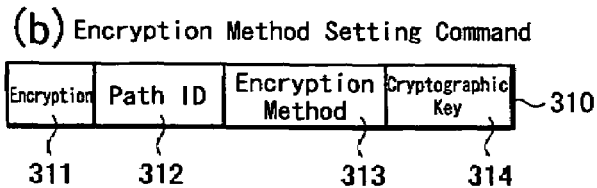
Figure 14:
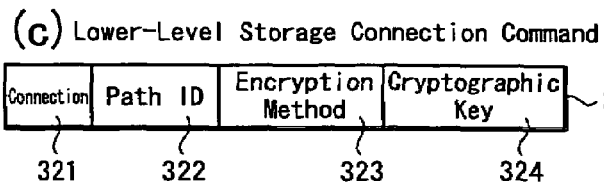
Figure 14:
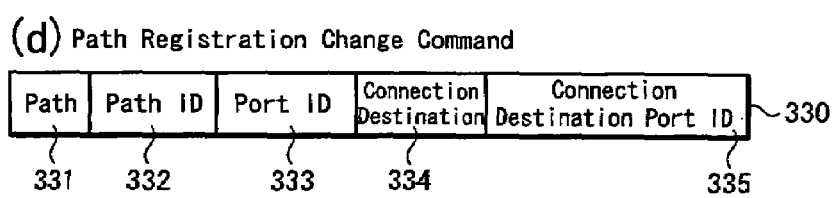
Figure 14:
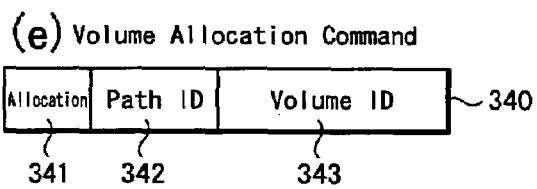
Figure 14:
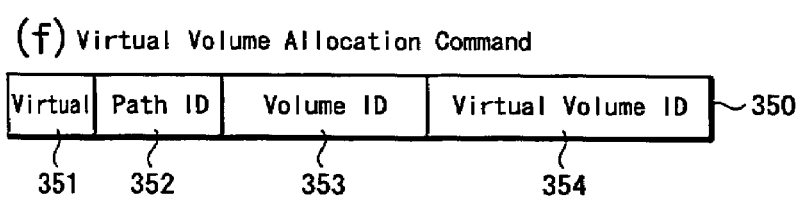
Figure 14:
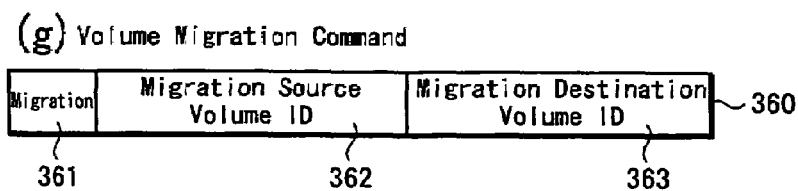
Figure 14:
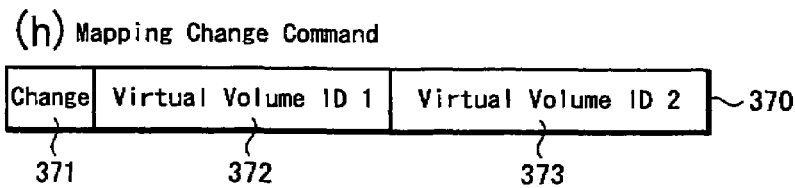

Next, processing in a case that the path between the storage device 3a that provides the virtual volume and the storage devices 3b and 3c that provide the real volume corresponding to the virtual volume does not support the encrypted transfer, in other word details of the processing in step S1008 of FIG. 9, is explained by using FIG. 13.

FIG. 13 is a process flow to migrate the contents of the virtual volume to other storage devices 3b and 3c that have an I/O port supporting the encrypted transfer and that provide a real volume corresponding to another virtual volume when the path between the storage device 3a that provides the virtual volume and the storage devices 3b and 3c that provide the real volume corresponding to the virtual volume does not correspond to the encrypted transfer.

First, the CPU 202 refers to the field 512 of the storage management table 510 and searches for storage devices 3b and 3c whose class is a "lower-level" showing that the storage device provides a real volume corresponding to a virtual volume and which provide a real volume corresponding to a virtual volume. Further, the CPU 202 refers to the field 523 of the port management table 520 and searches for storage devices 3b and 3c that have an I/O port 16 supporting the encrypted transfer and that provide the real volume corresponding to the virtual volume out of the storage devices 3b and 3c that are searched in the storage management table 510 and that provide the real volume corresponding to the virtual volume (step S3000).

Next, the CPU 202 sets a path between the I/O port 16 supporting the encrypted transfer in the storage device 3b and 3c searched in step S3000 that provide the real volume corresponding to the virtual volume and the storage device 3a that provides the virtual volume (step S3001). For this purpose, the CPU 202 transmits the path registration change command 330 to the storage devices 3b and 3c searched in step S3000 that provide the real volume corresponding to the virtual volume and to the storage device 3a providing the virtual volume that provides the virtual volume.

At this time, the CPU 202 generates and sets a new path ID in the field 332 of the path registration change command 330 shown in FIG. 14(d). Also, in the field 333, the CPU 202 sets a port ID for identifying the I/O port 16 specified in step S3000 when transmission is performed to the storage devices 3b and 3c that provide the real volume corresponding to the virtual volume. The CPU 202 sets a port ID of the I/O port 16 used by the former path when transmission is performed to the storage device 3a that provide the virtual volume.

Moreover, in the field 334, the CPU 202 sets a storage name of the storage device 3a that provides the virtual volume when the transmission is performed to the storage devices 3b and 3c that provide the real volume corresponding to the virtual volume. In addition, the CPU 202 sets storage names of the storage devices 3b and 3c specified in step S3000 that provide the real volume corresponding to the virtual volume when the transmission is performed to the storage device 3a that provides the virtual volume.

In the field 335, the CPU 202 sets a port ID of the I/O port 16 which is used for the former path by the storage device 3a that provides the virtual volume when the transmission is performed to the storage devices 3b and 3c that provide the real volume corresponding to the virtual volume. The CPU 202 sets a port ID for identifying the I/O port 16 specified in step S3000 when the transmission is performed to the storage device 3a that provides the virtual volume.

Next, in step S3002, the CPU 202 transmits a volume allocation command 340 to the storage devices 3b and 3c specified in step S3000 that provide the real volume corresponding to the virtual volume. FIG. 14(e) is one example of the volume allocation command 340. The volume allocation command 340 is comprised of a field 341 to show that this command is a volume allocation command, a field 342 to show a path ID for identifying a path to which a volume is allocated, and a field 343 to show a volume ID for identifying a volume to be allocated.

The CPU 202 executing the volume allocation change program 500 refers to the volume allocation table 110 of the storage devices 3b and 3c that provide the real volume corresponding to the virtual volume, and selects a volume in which a value of the field 114 is "0" among volumes to which a path ID is not set in the field 112 in order to set in the volume ID which is set into the field 343 of the volume allocation command 340. This volume is a volume that is not allocated to any path and that is not a virtual volume.

Upon receipt of this volume allocation command 340, the storage devices 3b and 3c that provide the real volume corresponding to the virtual volume allocate a volume specified in the field 343 to a path specified in the field 342. In addition, the CPU 202 sets a path ID in the field 112 of the corresponding entry of the volume allocation table 110. In step S3003, the CPU 202 receives an allocation completion notice showing the effect that the processing of the volume allocation command 340 is completed from the storage devices 3b and 3c that provide the real volume corresponding to the virtual volume.

Next, returning to FIG. 13, the CPU 202 transmits a virtual volume allocation command 350 to the storage device 3a that provides the virtual volume (step S3004). FIG. 14(f) is one example of the virtual volume allocation command 350. The virtual volume allocation command 350 is comprised of a field 351 to show that this command is a virtual volume allocation command, a field 352 to show a path ID to which the virtual volume is allocated, a field 353 to show a volume ID of a volume registered as the virtual volume in the storage devices 3b and 3c that provide the real volume corresponding to the virtual volume, a field 354 to show a virtual volume ID for identifying the virtual volume that is registered by this command.

The CPU 202 sets the path ID specified in step S3001 into the field 352, sets a volume ID of the volume 20 of the storage devices 3b and 3c selected in step S3002 that provide the real volume corresponding to the virtual volume into the field 353, and sets an ID of a newly created virtual volume into the field 354. The storage device 3a that provides the virtual volume and that has received this command adds an entry to the volume allocation table 110 and virtual volume table 120.

Returning to FIG. 13, the CPU 202 receives an allocation completion notice showing the effect that the processing of the virtual volume allocation command 350 is completed from the storage device 3a that provides the virtual volume (step S3005).

Next, the CPU 202 sets communication of the path registered in step S3001 into the encrypted transfer for the storage devices 3b and 3c that provide the real volume corresponding to the virtual volume (step S3006), and the CPU 202 uses the encrypted transfer to connect the storage device 3a that provides the virtual volume and the storage devices 3b and 3c that provide the real volume corresponding to the virtual volume. Since this processing is the processing of FIG. 11 described hereinbefore, an explanation thereof is omitted here.

Next, the CPU 202 transmits a volume migration command 360 to the storage device 3a that provides the virtual volume in order to migrate data of the former virtual volume into the virtual volume allocated in step S3003 (step S3007). FIG. 14(g) is one example of a form of the volume migration command 360. The volume migration command 360 is comprised of a field 361 to show that this command is a volume migration command 360, a field 362 to show a volume ID of a volume of a migration source, and a field 363 to show a volume ID of a volume of a migration destination.

The CPU 202 executing the volume allocation change program 500 sets a volume ID of the former virtual volume into the field 362, and sets a volume ID of the virtual volume allocated in S3003 into the field 363. The storage device 3a providing the virtual volume migrates data of the volume of the volume ID specified in the field 362 into the volume of the volume ID specified in the field 363.

Returning to FIG. 13, the CPU 202 receives a notice showing the effect that the processing of the volume migration command 360 is completed from the storage device that provides the virtual volume (step S3008). Next, the CPU 202 transmits a mapping change command 370 to set the volume ID of the former virtual volume into the virtual volume allocated in step S3004 to the storage device 3a that provides the virtual volume (step S3009). FIG. 14(h) is one example of a form of the mapping change command 370. The mapping change command 370 is comprised of a field 371 to show that this command is a mapping change command, a field 372 to show the former virtual volume ID, and a field 373 to show a virtual volume ID allocated in step S3003.

The storage device 3a that provide the virtual volume changes a value of the field 121 of the entry in which the value of the field 121 of the virtual volume table 120 corresponds to a value of the field 373 into a value of the field 372. In addition, the value of the field 121 of the entry in which the value of the field 121 of the virtual volume table 120 corresponds to the value of the field 372 is changed into the value of the field 373.

Then, the ID of the virtual volume allocated in step S3003 is replaced with the ID of the former virtual volume. Thereby, a volume allocation becomes not necessary to the path between the host computer 2 and the storage device 3a that provides the virtual volume. In addition, a setting change of a mount position of a volume becomes also not necessary in the host computer 2. The CPU 202 receives a change completion notice showing the effect that the execution of the mapping change command 370 is completed from the storage device 3a that provides the virtual volume (step S3010).

Last, the CPU 202 outputs a volume migration screen 420 to the display device 206, and the process of the CPU 202 makes a transition to S1009 of FIG. 8 (step S3011).

Figure 17:
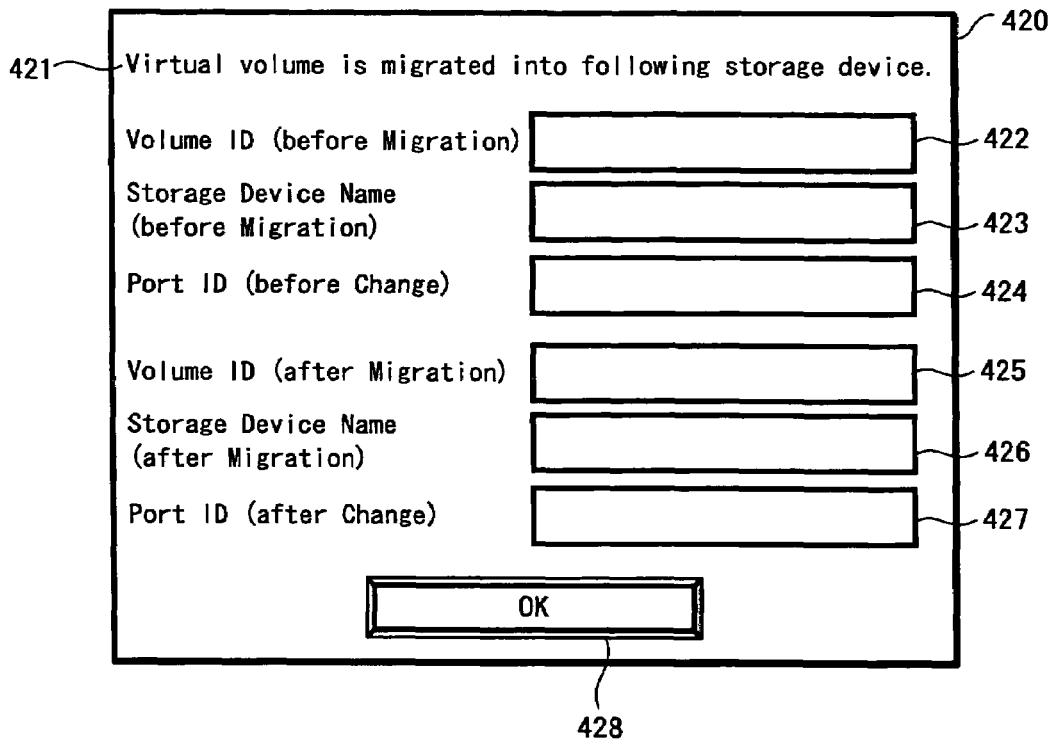
FIG. 17 is one example of a form of a volume migration screen.

FIG. 17 is one example of the volume migration screen 420. In the volume migration screen 420, the volume ID of the volume before the migration is displayed in a field 422, the storage name of the storage devices 3b and 3c that provide the real volume corresponding to the virtual volume by providing the volume before the migration is displayed in a field 423, and the port ID of the port used by the path to which the volume before the migration is allocated is displayed in a field 424.

In addition, a volume ID of the volume after the migration is displayed in a field 425, a storage name of the storage devices 3b and 3c that provide the real volume corresponding to the virtual volume by providing the volume after the migration is displayed in a field 426, and a port ID of a port used by a path to which the volume after the migration is allocated is displayed in a field 427.

Next, processing of the controller 11 that executes the storage control program 130 at the time of receiving various commands from the CPU 202 that executes the volume allocation change program 500 is explained by using FIG. 20 through FIG. 23.

Figure 20:
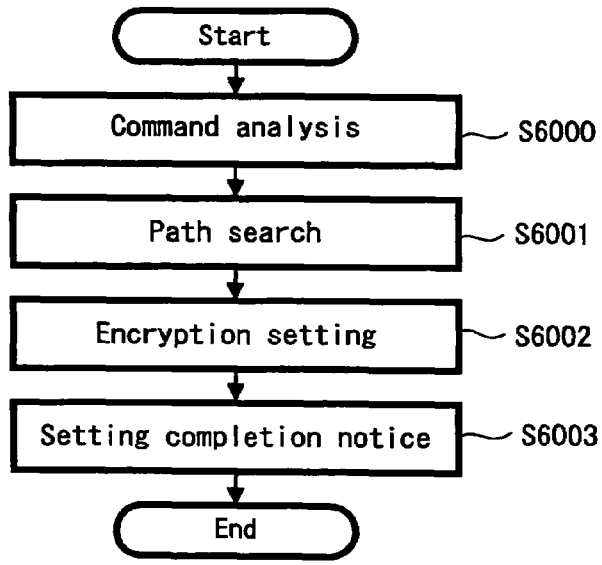
FIG. 20 is a diagram showing a process flow in which a storage control program changes a path into encrypted transfer.

FIG. 20 is a process flow when the controller 11 that executes the storage control program 130 receives the encryption method setting command 310 form the CPU 202 that executes the volume allocation change program 500. When the encryption method setting command 310 is received, the controller 11 that executes the storage control program 130 analyzes the command and obtains the path ID which is specified in the field 312 (step S6000).

Next, the controller 11 searches from the path table 100 for an entry in which the path ID of the field 101 corresponds to the path ID obtained in S6000 (step S6001).

Next, the controller 11 sets the encryption method of the field 313 of the encryption method setting command 310 into the field 105 of the entry that is searched in S6001 (step S6002). In addition, the controller 11 sets the cryptographic key of the field 314 of the encryption method setting command 310 into the field 106 of the entry that is searched in step S6001.

Last, the controller 11 notifies the volume allocation change program 500 of the effect that the processing of the encryption method setting command 310 is completed, and ends the processing (step S6003). In the processing of FIG. 20, the controller 11 sets the encryption method of the connection path with the host computer 2 in case of the storage device 3a that provides the virtual volume, and sets the encryption method of the connection path with the storage device 3a that provides the virtual volume in case of the storage devices 3b and 3c that provide the real volume corresponding to the virtual volume.

Figure 21:
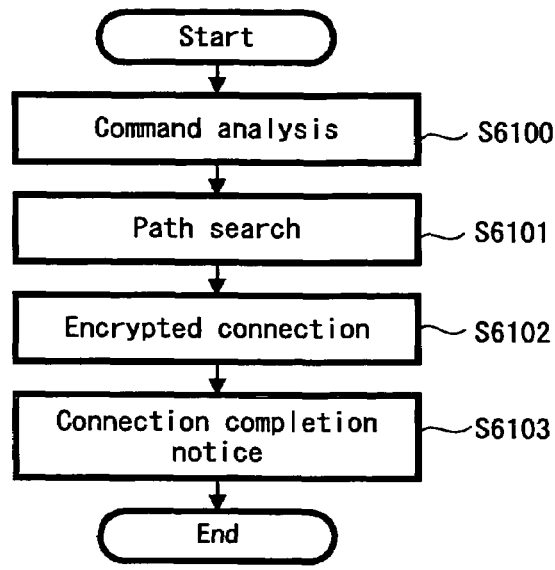
FIG. 21 is a diagram showing a process flow in which the storage control program makes a connection using encrypted transfer between a storage device that provides a virtual volume and a storage device that provides a real volume corresponding to the virtual volume.

FIG. 21 is a process flow when the controller 11 that executes the storage control program 130 receives the lower-level storage connection command 320 from the CPU 202 that executes the volume allocation change command 500. It should be noted that the processing of FIG. 21 is processing of only the storage device 3a that provides the virtual volume and the processing is not performed in the storage devices 3b and 3c that provide the real volume corresponding to the virtual volume.

When the lower-level storage connection command 320 is received, the controller 11 that executes the storage control program 130 analyzes the command and obtains the path ID that is specified in the field 322 (step S6100). Next, the controller 11 searches from the path table 100 for an entry in which the path ID of the field 101 corresponds to the path ID that is obtained in step S6100 (step S6101). Next, the controller 11 connects to the port of the connection destination port ID of the field 104 in the connection destination device of the field 103 by using the port of the storage port ID of the field 102 in the entry that is searched in step S6101 (step S6102).

At this time, the controller 11 makes the connection by using the encryption method specified in the field 323 of the lower-level storage connection command 320 and also using the cryptographic key of the field 324. Last, the controller 11 notifies the CPU 202 that executes the volume allocation change program 500 of the effect that the processing of the lower-level storage connection command 320 is completed, and ends the processing (step S6103).

Figure 22:
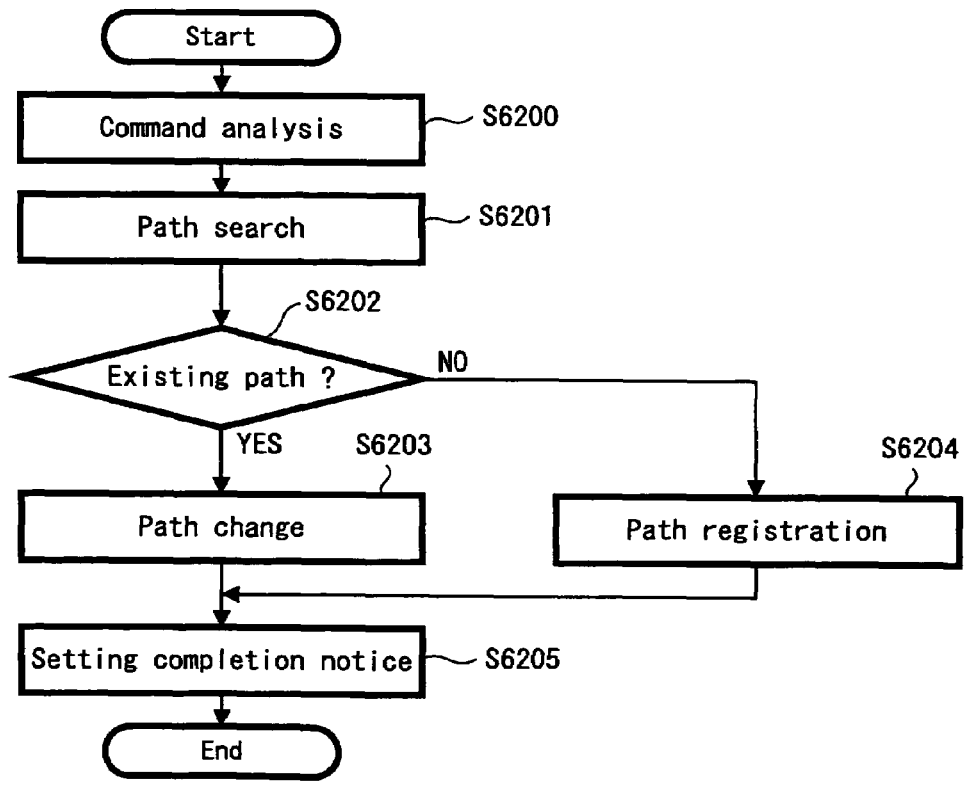
FIG. 22 is a diagram showing a process flow in which the storage control program changes and registers a connection path between a storage device that provides a virtual volume and a storage device that provides a real volume corresponding to the virtual volume.

FIG. 22 is a process flow when the controller 11 that executes the storage control program 130 receives the path registration change command 330 from the CPU 202 that executes the volume allocation change program 500. When the path registration change command 330 is received, the controller 11 that executes the storage control program 130 analyzes the command and obtains the path ID that is specified in the field 332 (step S6200).

Next, the controller 11 searches from the path table 100 for an entry in which the path ID of the field 101 corresponds to the path ID obtained in S6200 (step S6201).

The controller 11 judges from a result of the search in step S6001 whether there is the entry (step S6002), the process of the controller 11 makes a transition to step S6203 when there is the entry, and the process of the controller 11 makes a transition to step S6204 when the entry does not exists.

When there is the entry in step S6002, the controller 11 changes values of the field 102 to field 105 of the entry searched in step S6201 at the time that there is the entry into values of the field 333 to field 335 of the path registration command 330 (step S6203).

When the entry does not exists in step S6002, the controller 11 generates a new entry of the path table 130 and sets the values of the field 332 to field 335 of the path registration change command 330 into the field 101 to field 105 of the generated entry (step S6204). After completing the processing of either step S6203 or step S6204, the controller 11 notifies the CPU 202 that executes the volume allocation change program 500 of the effect that the processing of the path registration change command 330 is completed (step S6025), and ends the processing.

Figure 23:
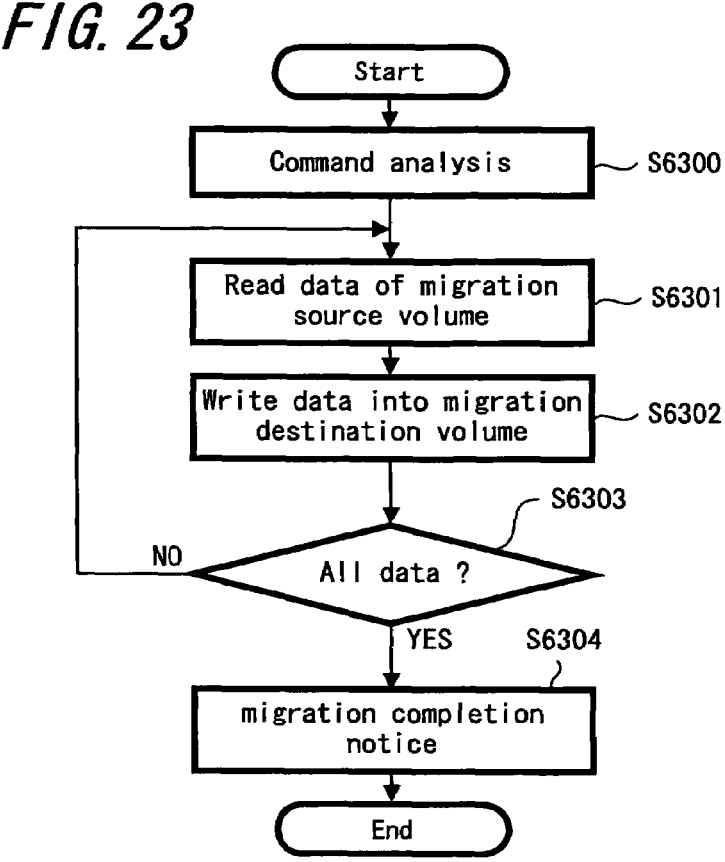
FIG. 23 is a diagram showing a process flow in which data in a volume is migrated into another volume by the storage control program.

FIG. 23 is a process flow when the controller 11 that executes the storage control program 130 receives the volume migration command from the CPU 202 that executes the volume allocation change program 500. It should be noted that the processing of FIG. 23 operates only in the storage device 3a that provides the virtual volume.

When the lower-level storage connection command 320 is received, the controller 11 that executes the storage control program 130 analyzes the command and obtains the migration source volume ID specified in the field 362 and the migration destination volume ID specified in the field 363 (step S6300).

Next, the controller 11 reads data of the volume of the migration source volume ID which is obtained in step S6300 (step S6301). Next, the controller 11 writes the data which is read in step S6301 onto the volume of the migration destination volume ID which is obtained in step S6300 (step S6302).

Next, the controller 11 judges whether all the data of the volume of the migration source volume ID is written onto the volume of the migration destination volume ID (step S6303), the process of the controller 11 makes a transition to step S6301 when the processing of all the data is not completed, and the process of the controller 11 makes a transition to step S6304 when this processing is completed. The controller 11 notifies the CPU 202 that executes the volume allocation change program 500 of the effect that the processing of the volume migration command 360 is completed (step S6304), and ends the processing.

Figure 24:
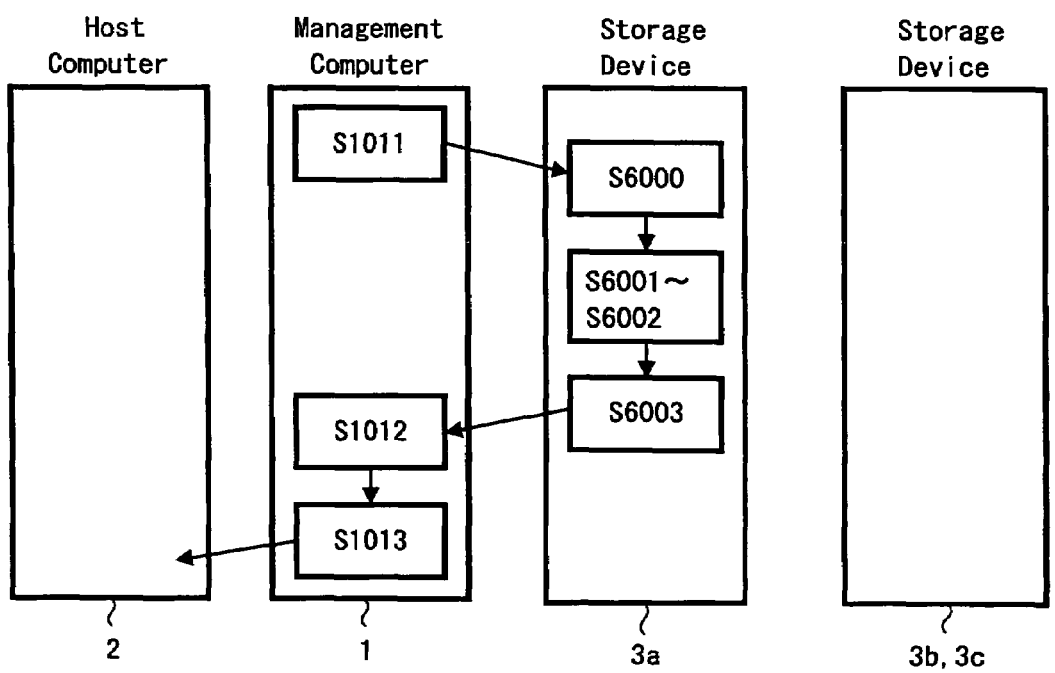
FIG. 24 is a diagram showing a timing chart among a host computer, a management computer, a storage device that provides a virtual volume, and a storage device that provides a real volume corresponding to the virtual volume.
Figure 25:
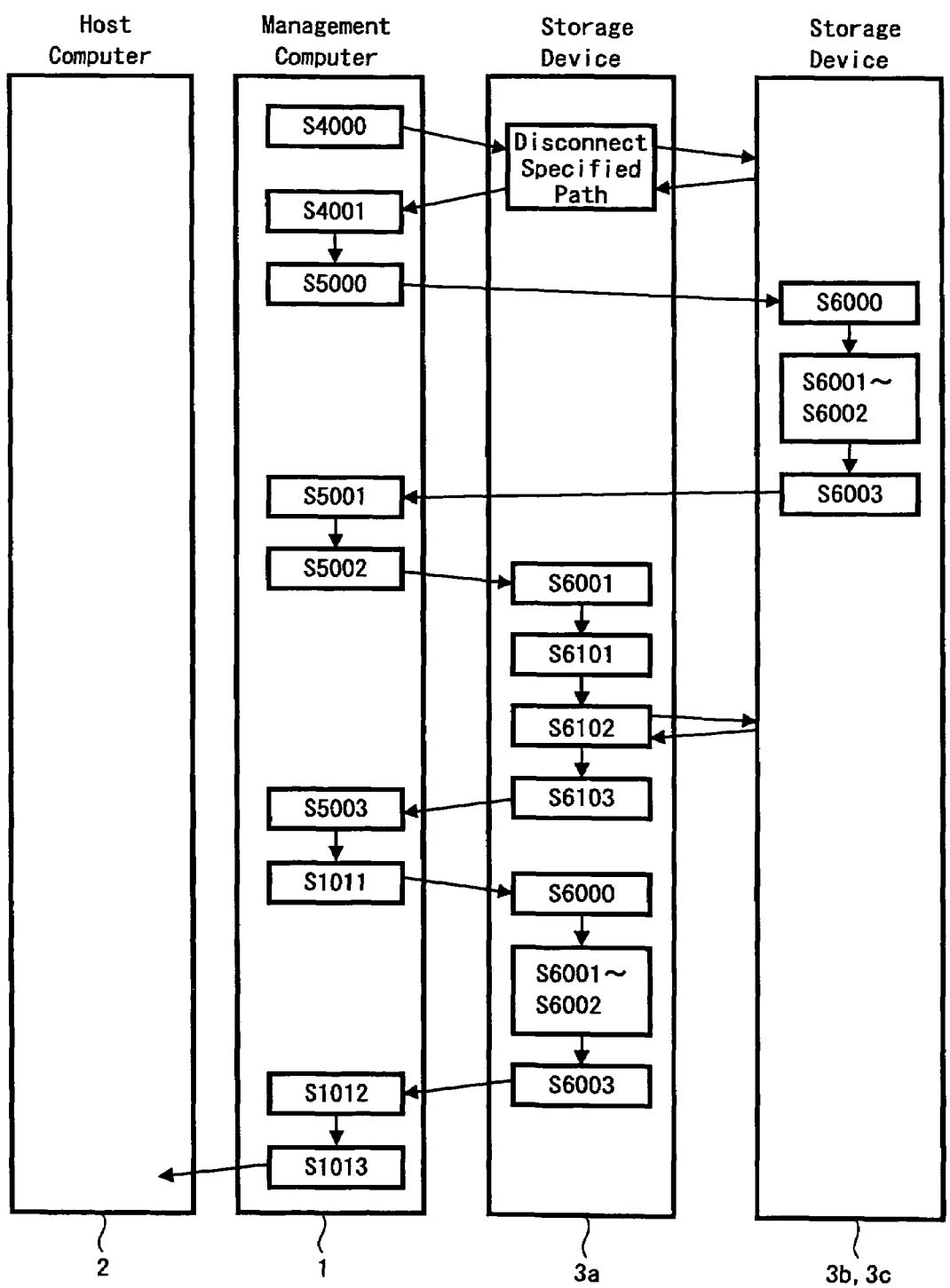
FIG. 25 is a diagram showing a timing chart among a host computer, a management computer, a storage device that provides a virtual volume, and a storage device that provides a real volume corresponding to the virtual volume.

Next, timing of the communication among the host computer 2, the management computer 1, the storage device 3a that provides the virtual volume, and the storage devices 3b and 3c that provide the real volume corresponding to the virtual volume is explained by referring to FIG. 24 and FIG. 25 in accordance with the process flow of the volume allocation program 500 and storage control program 130 which is explained hereinbefore.

FIG. 24 is a diagram showing a timing chart when the volume used by the host computer 2 requiring the encrypted transfer is the real volume 20 that is provided by the storage device 3a. A step numeral in this figure is the step numeral of each processing in FIG. 9 through FIG. 13 and FIG. 20 through FIG. 23.

The management computer 1 transmits the encryption method setting command 310 to the storage device 3a in step S1011. Then, the storage device 3a receives and analyzes this command (step S6000), changes the setting of the path specified in the command 310 into the encrypted transfer (step S6001, step S6002), and transmits a notice to the management computer 1 about the effect that the change is completed (step S6003). Accordingly, the management computer 1 notifies the host computer 2 of the effect that the setting is completed (step S1013) after obtaining the notice which is transmitted in S6003 by the storage device 3a that provides the virtual volume (step S1012).

FIG. 25 is a diagram showing a timing chart in a case where the volume used by the host computer 2 requiring the encrypted transfer is the volume 20 which is provided by the storage devices 3b and 3c that provide the real volume corresponding to the virtual volume and which is provided as the virtual volume by the storage device 3a that provides the virtual volume and in a case where the path between the storage volume 3a that provides the virtual volume and the storage devices 3b and 3c that provide the real volume corresponding to the virtual volume can be changed into the encrypted transfer.

The management computer 1 transmits the lower-level storage disconnection command 300 to the storage device 3a that provides the virtual volume (step S4000). When the command 300 is received, the storage device 3a that provides the virtual volume disconnects the path specified in the command 300, and notifies to the management computer 1 of the effect that the disconnection is completed. After obtaining the notice which is transmitted by the storage device 3a that provides the virtual volume (step S4001), the management computer 1 transmits the encryption method setting command to the storage devices 3b and 3c that provide the real volume corresponding to the virtual volume (step S5000).

The storage devices 3b and 3c that provide the real volume corresponding to the virtual volume receive and analyze this command in S6000, change the setting of the path specified in the command 310 into the encrypted transfer (step S6001, step S6002), and transmit a notice to the management computer about the effect that the change is completed (step S6003).

After obtaining the notice transmitted in S6003 by the storage devices 3b and 3c that provide the real volume corresponding to the virtual volume (step S5001), the management computer 2 transmits the lower-level storage connection command 320 to the storage device 3a that provides the virtual volume (step S5002).

The storage device 3a that provides the virtual volume receives and analyzes the command 320 (step S6100), searches for information of the path specified in the command 320 (step S6101), and connects the searched path by the encryption method specified in the command 320 (step S6102). Further, the effect that the connection is completed is notified to the management computer 1 (step S6103).

The management computer 1 receives the notice transmitted in S6013 by the storage device 3a that provides the virtual volume (step S5003), and transmits the encryption method setting command 310 to the storage device 3a that provides the virtual volume (step S1011).

The storage device 3a that provides the virtual volume receives and analyzes this command (step S6000), changes the setting of the path specified in the command 310 into the encrypted transfer (step S6001, step S6002), and transmits a notice to the management computer 1 about the effect that the change is completed (step S6003). After obtaining the notice transmitted in S6003 by the storage device 3a that provide the virtual volume (step S1012), the management computer 1 notifies the host computer 2 of the effect that the setting is completed (step S1013).

As can be understood from the above-described timing chart, the effect that the setting of the encrypted transfer is completed is notified to the host computer 2 after the setting of the encrypted transfer is completed in the storage device 3a that provides the virtual volume and in the storage devices 3b and 3c that provide the real volume corresponding to the virtual volume.

Although not illustrated, it should be noted that the effect that the setting is completed is notified to the host computer 2 after all the setting is completed even in a case where the path between the storage device 3a that provides the virtual volume and the storage device 3b and 3c that provide the real volume corresponding to the virtual volume needs to be changed to another port and even in a case where the volume 20 corresponding to the virtual volume needs to be migrated into the storage devices 3b and 3c that provide a real volume corresponding to another virtual volume.

As described hereinbefore, when the encrypted transfer becomes necessary between the host computer 2 and the storage device 3a that provides the virtual volume, the volume allocation change method according to the present embodiment uses the encrypted transfer to reconnect the path between the storage 3a that provides the virtual volume and the storage devices 3b and 3c that provide the real volume corresponding to the virtual volume in case that the host computer 2 uses the virtual volume 20 provided by the storage device 3a that provides the virtual volume.

In addition, when the I/O port 16 of the storage devices 3b and 3c that provide the real volume corresponding to the virtual volume, which is used to connect the path allocated to the volume 20 that becomes the virtual volume, does not support the encrypted transfer, the path is changed to another I/O port 16 and also the path is connected using the encrypted transfer.

In addition, when the storage devices 3b and 3c that provide the real volume corresponding to the virtual volume by providing the volume 20 that becomes the virtual volume does not have the I/O port 16 supporting the encrypted transfer, the data of the volume 20 is migrated into other storage devices 3b and 3c that are equipped with an I/O port 16 supporting the encrypted transfer and that provide a real volume corresponding to another virtual volume, also the path is connected using the encrypted transfer to the storage devices 3b and 3c that are equipped with the I/O port 16 supporting the encrypted transfer and that provide the real volume corresponding to another virtual volume, and the virtual volume is remapped to a volume 20 of the storage devices 3b and 3c that are equipped with the I/O port 16 supporting the encrypted transfer and that provide the real volume corresponding to another virtual volume.

Therefore, there is such an effect that the intervention and falsification can be prevented not only between the host computer 2 and the storage device 3a that provides the virtual volume but also between the storage device 3a that provides the virtual volume and the storage devices 3b and 3c that provide the real volume corresponding to the virtual volume since the encrypted transfer is set between the storage device 3a that provides the virtual volume and the storage devices 3b and 3c that provide the real volume corresponding to the virtual volume when the encrypted transfer becomes necessary between the host computer 2 and the storage device 3a that provides the virtual volume.

In addition, there is also such an effect that a setting man-hour of an administrator can be reduced and a setting mistake can be prevented since the program executes the above-described processing.

It should be noted that only one example in which the volume allocation change program 500 is provided in the management computer 1 is shown in the above-described embodiment but without limiting to this embodiment, the above-described operation may be performed by providing this program in the host computer 2 and the storage device 3.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A computer system comprised of a host computer, at least one storage device which stores data to be used by said host computer on a plurality of volumes, and a management computer which controls said storage device, wherein said management computer includes:
   a memory,
   a processor to perform control,
   an interface to input and output data to said storage device,
   a volume allocation change program to change an allocation of volumes in said storage device to provide logical unit numbers for the volumes that are recognized by said host computer and allocations of virtual volumes in which predetermined ones of said volumes are allocated virtually to said host computer;
   an identification information management table to manage identification information of said storage device; and
   a port management table to manage a port of said storage device, which tables are provided in said memory,
   wherein said processor executes said volume allocation change program to control timing of notifying said host computer of an access start to one of said volumes such that said timing is differentiated depending on whether said volume is one of said virtual volumes at a time of setting security to a path between said host computer and said volume,
   wherein said processor executes said volume allocation change program to:
   perform the control to the access from said host computer to a real volume that is not one of said virtual volumes such that an access start is notified to said host computer after receiving one security setting completion notice from a storage device that provides said real volume to said host computer when the security is set to a path between said host computer and said real volume, and
   perform control to the access from said host computer to said one of said virtual volumes such that an access start is notified to said host computer after receiving two or more security setting completion notices from two or more storage devices that provide said virtual volume to said host computer when the security is set to paths between said host computer and said virtual volume and between said virtual volume and a real volume corresponding to said virtual volume,
   wherein said two or more security setting completion notices are received from a virtualized device that provides said virtual volume to said host computer and a storage device that provides the real volume corresponding to said virtual volume, which are included in said two or more storage devices, and
   wherein said processor executes said volume allocation change program to change over to another path which is a path between said host computer and a storage device that provides the real volume corresponding to said virtual volume and to which said security can be set when a path between said virtual volume and the real volume corresponding to said virtual volume is a path to which the security can not be set.

2. A computer system comprised of a host computer, at least one storage device which stores data to be used by said host computer on a plurality of volumes, and a management computer which controls said storage device, wherein said management computer includes:
   a memory,
   a processor to perform control,
   an interface to input and output data to said storage device,
   a volume allocation change program to change an allocation of volumes in said storage device to provide logical unit numbers for the volumes that are recognized by said host computer and allocations of virtual volumes in which predetermined ones of said volumes are allocated virtually to said host computer;
   an identification information management table to manage identification information of said storage device; and
   a port management table to manage a port of said storage device, which tables are provided in said memory,
   wherein said processor executes said volume allocation change program to control timing of notifying said host computer of an access start to one of said volumes such that said timing is differentiated depending on whether said volume is one of said virtual volumes at a time of setting security to a path between said host computer and said volume,
   wherein said processor executes said volume allocation change program to:
   perform the control to the access from said host computer to a real volume that is not one of said virtual volumes such that an access start is notified to said host computer after receiving one security setting completion notice from a storage device that provides said real volume to said host computer when the security is set to a path between said host computer and said real volume, and perform control to the access from said host computer to said one of said virtual volumes such that an access start is notified to said host computer after receiving two or more security setting completion notices from two or more storage devices that provide said virtual volume to said host computer when the security is set to paths between said host computer and said virtual volume and between said virtual volume and a real volume corresponding to said virtual volume, wherein said two or more security setting completion notices are received from a virtualized device that provides said virtual volume to said host computer and a storage device that provides the real volume corresponding to said virtual volume, which are included in said two or more storage devices, and, wherein said processor executes said volume allocation change program to migrate data of the real volume corresponding to said virtual volume into another storage system that can set said security when the storage device that provides the real volume corresponding to said virtual volume can not set the security to a path between said virtual volume and the real volume corresponding to said virtual volume.

3. A management computer to control at least one storage device which stores data to be used by a host computer on a plurality of volumes, said management computer comprising:

a memory, a processor to perform control, an interface to input and output data to said storage device, a volume allocation change program to change an allocation of volumes in said storage device to provide logical unit numbers for the volumes that are recognized by said host computer and allocations of virtual volumes in which predetermined ones of said volumes are allocated virtually to said host computer;

an identification information management table to manage identification information of said storage device; and a port management table to manage a port of said storage device, which tables are provided in said memory, wherein said processor executes said volume allocation change program to perform control such that timing of notifying said host computer of an access start to one of said volumes is differentiated depending on whether said volume is one of said virtual volumes at a time of setting security to a path between said host computer and said volume, wherein said processor executes said volume allocation change program to:

perform the control to the access from said host computer to a real volume that is not one of said virtual volumes such that an access start is notified to said host computer after receiving one security setting completion notice from a storage device that provides said real volume to said host computer when the security is set to a path between said host computer and said real volume, and perform the control to the access from said host computer to said one of said virtual volumes such that an access start is notified to said host computer after receiving two or more security setting completion notices from two or more storage devices that provide said virtual volume to said host computer when the security is set to paths between said host computer and said virtual volume and between said virtual volume and a real volume corresponding to said virtual volume, wherein said two or more security setting completion notices are received from a virtualized device that provides said virtual volume to said host computer and a storage device that provides the real volume corresponding to said virtual volume, which are included in said two or more storage devices, wherein said processor that executes said volume allocation change program changes over to another path which is a path between said host computer and a storage device that provides a real volume corresponding to said virtual volume and to which said security can be set when a path between said virtual volume and the real volume corresponding to said virtual volume is a path to which the security can not be set.

4. A management computer to control at least one storage device which stores data to be used by a host computer on a plurality of volumes, said management computer comprising:

a memory, a processor to perform control, an interface to input and output data to said storage device, a volume allocation change program to change an allocation of volumes in said storage device to provide logical unit numbers for the volumes that are recognized by said host computer and allocations of virtual volumes in which predetermined ones of said volumes are allocated virtually to said host computer;

an identification information management table to manage identification information of said storage device; and a port management table to manage a port of said storage device, which tables are provided in said memory, wherein said processor executes said volume allocation change program to perform control such that timing of notifying said host computer of an access start to one of said volumes is differentiated depending on whether said volume is one of said virtual volumes at a time of setting security to a path between said host computer and said volume, wherein said processor executes said volume allocation change program to:

perform the control to the access from said host computer to a real volume that is not one of said virtual volumes such that an access start is notified to said host computer after receiving one security setting completion notice from a storage device that provides said real volume to said host computer when the security is set to a path between said host computer and said real volume, and perform the control to the access from said host computer to said one of said virtual volumes such that an access start is notified to said host computer after receiving two or more security setting completion notices from two or more storage devices that provide said virtual volume to said host computer when the security is set to paths between said host computer and said virtual volume and between said virtual volume and a real volume corresponding to said virtual volume, wherein said two or more security setting completion notices are received from a virtualized device that provides said virtual volume to said host computer and a storage device that provides the real volume corresponding to said virtual volume, which are included in said two or more storage devices, wherein said processor that executes said volume allocation change program migrates data of the real volume corresponding to said virtual volume into another storage device that can set said security when the storage device that provides the real volume corresponding to said virtual volume can not set the security to a path between said virtual volume and the real volume corresponding to said virtual volume.

5. A volume allocation change method of a management computer to control at least one storage device which stores data to be used by a host computer on a plurality of volumes,
wherein the control is performed such that timing of notifying said host computer of an access start to one of said volumes is differentiated depending on whether said volume is a virtual volume at a time of setting security to a path between said host computer and said volume,
wherein the control is performed to the access from said host computer to a real volume that is not a virtual volume such that an access start is notified to said host computer after receiving one security setting completion notice from a storage device that provides said real volume to said host computer when the security is set to a path between said host computer and said real volume, and
the control is performed to the access from said host computer to said virtual volume such that an access start is notified to said host computer after receiving two or more security setting completion notices from two or more storage devices that provide said virtual volume to said host computer when the security is set to paths between said host computer and said virtual volume and between said virtual volume and a real volume corresponding to said virtual volume,
wherein the volume allocation change method changes over to another path which is a path between said host computer and a storage device that provides a real volume corresponding to said virtual volume and to which said security can be set when a path between said virtual volume and the real volume corresponding to said virtual volume is a path to which the security can not be set.

6. A volume allocation change method of a management computer to control at least one storage device which stores data to be used by a host computer on a plurality of volumes,
wherein the control is performed such that timing of notifying said host computer of an access start to one of said volumes is differentiated depending on whether said volume is a virtual volume at a time of setting security to a path between said host computer and said volume,
wherein the control is performed to the access from said host computer to a real volume that is not a virtual volume such that an access start is notified to said host computer after receiving one security setting completion notice from a storage device that provides said real volume to said host computer when the security is set to a path between said host computer and said real volume, and
the control is performed to the access from said host computer to said virtual. volume such that an access start is notified to said host computer after receiving two or more security setting completion notices from two or more storage devices that provide said virtual volume to said host computer when the security is set to paths between said host computer and said virtual volume and between said virtual volume and a real volume corresponding to said virtual volume,
wherein the volume allocation change method migrates data of the real volume corresponding to said virtual volume into another storage device that can set said security when the storage device that provides the real volume corresponding to said virtual volume can not set the security to a path between said virtual volume and the real volume corresponding to said virtual volume.

* * * * *